United States Patent
Nomura

(10) Patent No.: US 10,807,523 B2
(45) Date of Patent: Oct. 20, 2020

(54) LIGHT EMITTING UNIT FOR CONVEYANCE

(71) Applicant: TS TECH CO., LTD., Saitama (JP)

(72) Inventor: Masahiro Nomura, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 0 days.

(21) Appl. No.: 16/321,196

(22) PCT Filed: Jul. 27, 2017

(86) PCT No.: PCT/JP2017/027343
§ 371 (c)(1),
(2) Date: Jan. 28, 2019

(87) PCT Pub. No.: WO2018/021504
PCT Pub. Date: Feb. 1, 2018

(65) Prior Publication Data
US 2019/0168666 A1    Jun. 6, 2019

(30) Foreign Application Priority Data

Jul. 29, 2016  (JP) ................................. 2016-150708
Jul. 29, 2016  (JP) ................................. 2016-150709
(Continued)

(51) Int. Cl.
*B60Q 3/217*    (2017.01)
*B60Q 3/80*     (2017.01)
(Continued)

(52) U.S. Cl.
CPC .............. *B60Q 3/217* (2017.02); *B60K 35/00* (2013.01); *B60K 37/00* (2013.01); *B60Q 3/66* (2017.02);
(Continued)

(58) Field of Classification Search
CPC ... B60Q 3/66; B60Q 3/70; B60Q 3/78; B60Q 3/80; B60Q 3/217; B60Q 9/002;
(Continued)

(56) References Cited

U.S. PATENT DOCUMENTS 6,160,475 A * 12/2000 Hornung ................ B60Q 3/217
                                                    307/10.8
9,950,685 B1 *  4/2018 Deyaf .................... B60R 21/12
(Continued)

FOREIGN PATENT DOCUMENTS

DE    10200057725 A1   6/2008
DE    102011121392 A1  6/2013
(Continued)

OTHER PUBLICATIONS

International Search Report dated Oct. 24, 2017 for corresponding PCT Application No. PCT/JP2017/027343, with translation.
(Continued)

*Primary Examiner* — Jong-Suk (James) Lee
*Assistant Examiner* — Christopher E Dunay
(74) *Attorney, Agent, or Firm* — Michael Best & Friedrich LLP

(57) ABSTRACT

It is intended to cause a light emitter to properly emit light for notifying an occupant of a movement direction of an object approaching a conveyance. A vehicle lighting device includes sensors (3a, 3b, 3c, 3d) configured to detect an approaching object approaching a vehicle, light emitters (5) attached to the vehicle, and a control device (2) configured to control the light emitter (5) when the sensor (3a, 3b, 3c, 3d) has detected the approaching object. The control device (2) controls the light emitter (5) such that a light emitting spot of the light emitter (5) moves along a direction corresponding to a movement direction of the approaching object.

9 Claims, 26 Drawing Sheets

(30) Foreign Application Priority Data

Jul. 29, 2016 (JP) .................................. 2016-150710
Jul. 29, 2016 (JP) .................................. 2016-150711

(51) Int. Cl.
| | | |
|---|---|---|
| *B60Q 9/00* | (2006.01) | |
| *B60K 37/00* | (2006.01) | |
| *B60K 35/00* | (2006.01) | |
| *B60Q 3/78* | (2017.01) | |
| *B60Q 3/70* | (2017.01) | |
| *B60Q 3/66* | (2017.01) | |
| *B60R 13/02* | (2006.01) | |

(52) U.S. Cl.
CPC .................. *B60Q 3/70* (2017.02); *B60Q 3/78* (2017.02); *B60Q 3/80* (2017.02); *B60Q 9/002* (2013.01); *B60Q 9/007* (2013.01); *B60Q 9/008* (2013.01); *B60R 13/0243* (2013.01); *B60K 2370/178* (2019.05); *B60K 2370/179* (2019.05); *B60K 2370/338* (2019.05); *B60K 2370/794* (2019.05)

(58) Field of Classification Search
CPC ........ B60Q 9/007; B60Q 9/008; B60K 35/00; B60K 37/00; B60R 13/0243
See application file for complete search history.

(56) References Cited

U.S. PATENT DOCUMENTS

| | | | |
|---|---|---|---|
| 2006/0097857 A1 | 5/2006 | Osaka et al. | |
| 2007/0183156 A1* | 8/2007 | Shan | B60Q 1/2611 362/277 |
| 2008/0136609 A1* | 6/2008 | Nakatani | B60Q 1/2665 340/425.5 |
| 2013/0235604 A1 | 9/2013 | Ukai et al. | |
| 2014/0355287 A1* | 12/2014 | Sohizad | B60Q 3/74 362/545 |
| 2015/0085509 A1 | 3/2015 | Tahara et al. | |
| 2015/0127212 A1* | 5/2015 | Chacon | B60R 21/013 701/32.4 |
| 2015/0217689 A1* | 8/2015 | Frik | B60Q 9/00 340/436 |
| 2016/0097928 A1 | 4/2016 | Muramatsu | |
| 2016/0114726 A1* | 4/2016 | Nagata | B60Q 9/007 340/435 |
| 2016/0133135 A1* | 5/2016 | Iliev | G08G 1/162 340/903 |
| 2016/0203792 A1 | 7/2016 | Yamada | |
| 2016/0250963 A1* | 9/2016 | Reuschel | B60Q 1/0035 362/543 |
| 2017/0069212 A1 | 3/2017 | Miyazawa et al. | |
| 2017/0144596 A1* | 5/2017 | Wu | B60Q 1/323 |
| 2017/0182936 A1 | 6/2017 | Kawamata et al. | |
| 2017/0320430 A1 | 11/2017 | Kawamata et al. | |
| 2018/0086346 A1 | 3/2018 | Fujisawa et al. | |
| 2018/0118109 A1 | 5/2018 | Fujisawa et al. | |
| 2018/0257558 A1* | 9/2018 | Berlitz | B60Q 3/54 |
| 2019/0090091 A1 | 3/2019 | Berlitz | |

FOREIGN PATENT DOCUMENTS

| | | |
|---|---|---|
| DE | 102013215176 A1 | 2/2015 |
| JP | 2005-280436 A | 10/2005 |
| JP | 2006-103373 A | 4/2006 |
| JP | 2006-119840 A | 5/2006 |
| JP | 2006-137330 A | 6/2006 |
| JP | 2010-264952 A | 11/2010 |
| JP | 2012-221487 A | 11/2012 |
| JP | 2013-086532 A | 5/2013 |
| JP | 2013-180634 A | 9/2013 |
| JP | 2014-094656 A | 5/2014 |
| JP | 2014-129098 A | 7/2014 |
| JP | 2014-189101 A | 10/2014 |
| JP | 2015-063230 A | 4/2015 |
| JP | 2015-151078 A | 8/2015 |
| JP | 2016-068600 A | 5/2016 |
| JP | 2016-074312 A | 5/2016 |
| JP | 2016-076037 A | 5/2016 |
| JP | 2016-088105 A | 5/2016 |
| JP | 2016-130039 A | 7/2016 |
| JP | 2016-130068 A | 7/2016 |
| WO | 2015/178303 A1 | 11/2015 |
| WO | 2016/157892 A1 | 10/2016 |
| WO | 2017/134105 A1 | 8/2017 |

OTHER PUBLICATIONS

Japanese Office Action dated Dec. 18, 2018 for corresponding Japanese Patent Application No. 2016-150708, with machine translation.
Japanese Office Action dated Dec. 18, 2018 for corresponding Japanese Patent Application No. 2016-150709, with machine translation.
Japanese Office Action dated Dec. 18, 2018 for corresponding Japanese Patent Application No. 2016-150710, with machine translation.
Japanese Office Action dated Dec. 18, 2018 for corresponding Japanese Patent Application No. 2016-150711, with machine translation.
Extended European Search Report dated Jul. 25, 2019 for corresponding European patent application No. 17834506.2.
Japanese Office Action dated Sep. 24, 2019 for corresponding Japanese Patent Application No. 2016-150708.
Japanese Office Action dated Sep. 10, 2019 for corresponding Japanese Patent Application No. 2016-150709.
Japanese Office Action dated Sep. 24, 2019 for corresponding Japanese Patent Application No. 2016-150711.
Office Action dated Apr. 21, 2020 for corresponding Japanese Patent Application No. 2016-150709.
Office Action dated May 12, 2020 for corresponding Japanese Patent Application No. 2016-150711.
Extended European Searcg Report (EESR) dated Aug. 4, 2020 for the corresponding European patent application No. 20158720.1.

* cited by examiner

LIGHT EMITTING UNIT FOR CONVEYANCE

CROSS-REFERENCE TO RELATED APPLICATIONS

This application is entering into the national phase of PCT Application No. PCT/JP2017/027343, filed on Jul. 27, 2017. Further, this application claims the benefit of priority from Japanese Application No. 2016-150708, 2016-150709, 2016-150710, and 2016-150711, all filed on Jul. 29, 2016, the entire contents of which are incorporated herein by reference.

TECHNICAL FIELD

The present invention relates to a conveyance light emitting unit, and specifically relates to a conveyance light emitting unit capable of moving a light emitting spot in a predetermined direction.

BACKGROUND ART

The technique of causing a light emitter provided inside a room of a conveyance to emit light in a predetermined light emitting form to notify an occupant of the conveyance about various types of information has been already known. One example will be described. In a light emitting unit (described as a "display system inside a vehicle compartment" in Patent Literature 1) for a vehicle as described in Patent Literature 1, the presence of an object at the periphery of the vehicle is, as vehicle peripheral information, notified in such a manner that a display lamp in the vehicle is turned on or blinks.

More specifically, in Patent Literature 1, when an opposing object (specifically, other automobiles, bicycles, pedestrians, etc.) are approaching the vehicle, the display lamp is turned on or blinks to notify an occupant of the presence of the opposing object. Moreover, in Patent Literature 1, a pair of right and left display lamps is arranged, and the display lamp on a side on which the opposing object is present is turned on or blinks.

CITATION LIST

Patent Literature

PATENT LITERATURE 1: JP 2016-074312 A

SUMMARY OF INVENTION

Technical Problem

When approaching of the opposing object is notified to the occupant, the direction from which the opposing object is approaching, i.e., the movement direction (the approaching direction) of the opposing object, needs to be notified. For notifying the movement direction of the opposing object by light emission from the light emitter, it is necessary for the light emitter to properly emit light so that the occupant can accurately grasp the movement direction.

The present invention has been made in view of the above-described problem, and is intended to provide a conveyance light emitting unit capable of properly emitting light from a light emitter to notify an occupant of a movement direction of an object approaching a conveyance.

Solution to Problem

The above-described problem is solved by a conveyance light emitting unit of the present invention including a detector configured to detect an object approaching a conveyance, a light emitter attached to the conveyance, and a controller configured to control the light emitter when the detector has detected the object. The controller controls the light emitter such that a light emitting spot of the light emitter moves along a direction corresponding to the movement direction of the object detected by the detector.

In the conveyance light emitting unit, the light emitting spot of the light emitter attached to the conveyance moves along the direction corresponding to the movement direction (the approaching direction) of the object approaching the conveyance. Thus, an occupant visually recognizes movement (the flow) of the light emitting spot to recognize the movement direction of the object.

Moreover, in the above-described configuration, when the detector has detected the object approaching the conveyance from a rear side of the conveyance in a forward traveling state or a stop state, the controller may control the light emitter such that the light emitting spot moves forward from the rear side in a front-to-rear direction of the conveyance.

In the above-described configuration, when the object is approaching the conveyance from the rear side of the conveyance in the forward traveling state or the stop state, the light emitter (more precisely, the movement direction of the light emitting spot) can be properly controlled to accurately notify the occupant of the movement direction (the approaching direction) of the object.

Further, in the above-described configuration, when the detector has detected the object approaching the conveyance from a front side of the conveyance in the forward traveling state, the controller may control the light emitter such that the light emitting spot moves backward from the front side in the front-to-rear direction of the conveyance.

In the above-described configuration, when the object is approaching the conveyance from the front side of the conveyance in the forward traveling state, the light emitter (more precisely, the movement direction of the light emitting spot) can be properly controlled to accurately notify the occupant of the movement direction (the approaching direction) of the object.

In addition, in the above-described configuration, when the detector has detected the object, the controller may identify at least one item of a distance between the conveyance and the object and an approaching speed when the object is approaching the conveyance, and may control the light emitter such that the light emitting spot moves at a movement speed corresponding to an identified result of the item.

In the above-described configuration, the movement speed of the light emitting spot is changed according to the identified result of at least one item of the distance between the conveyance and the object approaching the conveyance and the approaching speed of the object. Accordingly, based on a change in the movement speed of the light emitting spot, the occupant grasps the status (specifically, the degree of approaching etc.) of the object approaching the conveyance.

Moreover, in the above-described configuration, when identifying the distance, the controller may control the light emitter such that the light emitting spot moves faster as the distance decreases and moves slower as the distance increases. When identifying the approaching speed, the controller may control the light emitter such that the light emitting spot moves faster as the approaching speed increases and moves slower as the approaching speed decreases.

In the above-described configuration, when the identified result of at least one item of the distance between the conveyance and the object approaching the conveyance and the approaching speed of the object changes, the movement speed of the light emitting spot changes accordingly. Thus, based on the degree of change in the movement speed of the light emitting spot, the occupant grasps a change in the status of the object approaching the conveyance.

Further, in the above-described configuration, the light emitter may emit light such that the light emitting spot moves while blinking. When the detector has detected the object, the controller may identify at least one item of the distance between the conveyance and the object and the approaching speed when the object is approaching the conveyance, and may control the light emitter such that the light emitting spot moves while blinking at a blinking speed corresponding to the identified result of the item.

In the above-described configuration, the status of the object approaching the conveyance can be notified to the occupant of the conveyance via a change in the blinking speed of the light emitting spot.

In addition, in the above-described configuration, the emission color of the light emitting spot may be variable. When the detector has detected the object, the controller may identify at least one item of the distance between the conveyance and the object and the approaching speed when the object is approaching the conveyance, and may control the light emitter such that the emission color of the light emitting spot changes to a color corresponding to the identified result of the item.

In the above-described configuration, the status of the object approaching the conveyance can be notified to the occupant of the conveyance via a change in the emission color of the light emitting spot.

Moreover, in the above-described configuration, the light emitter may include two light emitters provided separately from each other in a width direction of the conveyance. When the detector has detected the object, the controller may identify the position of the object relative to the conveyance, and may cause only one, which corresponds to an identified result of the position, of the two light emitters to emit light.

In the above-described configuration, a pair of right and left light emitters is arranged, and the light emitter corresponding to the position of the object approaching the conveyance among the two light emitters emits light. Accordingly, the approaching direction of the object approaching the conveyance and the position (precisely, which one of right and left sides of the conveyance the object is positioned) of the object can be accurately notified to the occupant of the conveyance.

Further, in the above-described configuration, the light emitter may be arranged at a front portion of a member facing the inside of a room of the conveyance among members forming a door provided at the conveyance.

In the above-described configuration, the light emitter is arranged at the front portion of the member facing the inside of the room of the conveyance among the door components, and therefore, the occupant of the conveyance easily visually recognizes the light emitter. Accordingly, the occupant properly visually recognizes movement of the light emitting spot of the light emitter, and as a result, the movement direction (the approaching direction) of the object approaching the conveyance can be reliably notified to the occupant.

Advantageous Effects of Invention

According to the present invention, the occupant of the conveyance visually recognizes movement (the flow) of the light emitting spot to recognize the movement direction of the object approaching the conveyance.

Moreover, according to the present invention, when the object is approaching the conveyance from the rear side of the conveyance in the forward traveling state or the stop state, the light emitter can be properly controlled to accurately notify the occupant of the movement direction of the object.

In addition, according to the present invention, when the object is approaching the conveyance from the front side of the conveyance in the forward traveling state, the light emitter can be properly controlled to accurately notify the occupant of the movement direction of the object.

Further, according to the present invention, based on a change in the movement speed of the light emitting spot, the occupant of the conveyance grasps the status of the object approaching the conveyance.

Moreover, according to the present invention, based on the degree of change in the movement speed of the light emitting spot, the occupant of the conveyance grasps a change in the status of the object approaching the conveyance.

Further, according to the present invention, the status of the object approaching the conveyance can be notified to the occupant of the conveyance via a change in the blinking speed of the light emitting spot.

In addition, according to the present invention, the status of the object approaching the conveyance can be notified to the occupant of the conveyance via a change in the emission color of the light emitting spot.

Moreover, according to the present invention, the approaching direction of the object approaching the conveyance and the position of the object can be accurately notified to the occupant of the conveyance.

Further, according to the present invention, the light emitter is arranged at the front portion of the member facing the inside of the room of the conveyance among the door components, and therefore, the occupant of the conveyance easily visually recognizes the light emitter. Accordingly, the traveling direction of the conveyance can be reliably notified to the occupant.

DESCRIPTION OF EMBODIMENTS

<<Conveyance Light Emitting Unit according to One Embodiment of Present Invention>>

Hereinafter, one embodiment (the present embodiment) of the present invention will be described with reference to the drawings. Note that the embodiment described below will be set forth merely as one example for the sake of easy understanding of the present invention, and is not intended to limit the present invention. That is, changes and modifications can be made to the present invention without departing from the gist of the present invention, and needless to say, the present invention includes equivalents thereof.

Moreover, a lighting device (hereinafter referred to as a "vehicle lighting device 1") mounted on a vehicle will be hereinafter described as an example of a conveyance light emitting unit according to the present embodiment. Note that the present invention is also applicable to other conveyances than the vehicle, and for example, is also applicable to a motorcycle, a motor tricycle, a ship, and an airplane.

Note that in description below, "right and left" mean a right-to-left direction when an occupant of the vehicle views the vehicle from the front thereof. Moreover, a "front-to-rear direction" means a front-to-rear direction of the vehicle.

(Use of Vehicle Lighting Device 1)

First, use of the vehicle lighting device 1 will be outlined. The vehicle lighting device 1 is mounted on the vehicle V, and is configured to emit light inside a vehicle compartment (corresponding to the inside of a room) to notify the occupant in the vehicle compartment, specifically a driver, about the presence of an approaching object to alert the occupant. The "approaching object" described herein is an object approaching the vehicle V upon parking, and is an object moving relative to the vehicle V. Specifically, the approaching object includes, for example, other vehicles, motorcycles, bicycles, persons, animals, and installed objects such as building walls and power poles at the periphery of the vehicle V.

More specifically, the vehicle lighting device 1 according to the present embodiment is configured to notify, when the driver of the vehicle V changes lane while the vehicle V is moving (traveling) forward, the occupant (precisely, the driver) of the vehicle V about the presence of an approaching subsequent vehicle as the approaching object on the changed lane by light emission. Note that the "approaching subsequent vehicle" means another vehicle traveling in the rear of the vehicle V on the changed lane (precisely, a change target lane), and means a vehicle present within a predetermined distance range from the vehicle V.

(Equipment Configuration of Vehicle Lighting Device 1)

Figure 1:
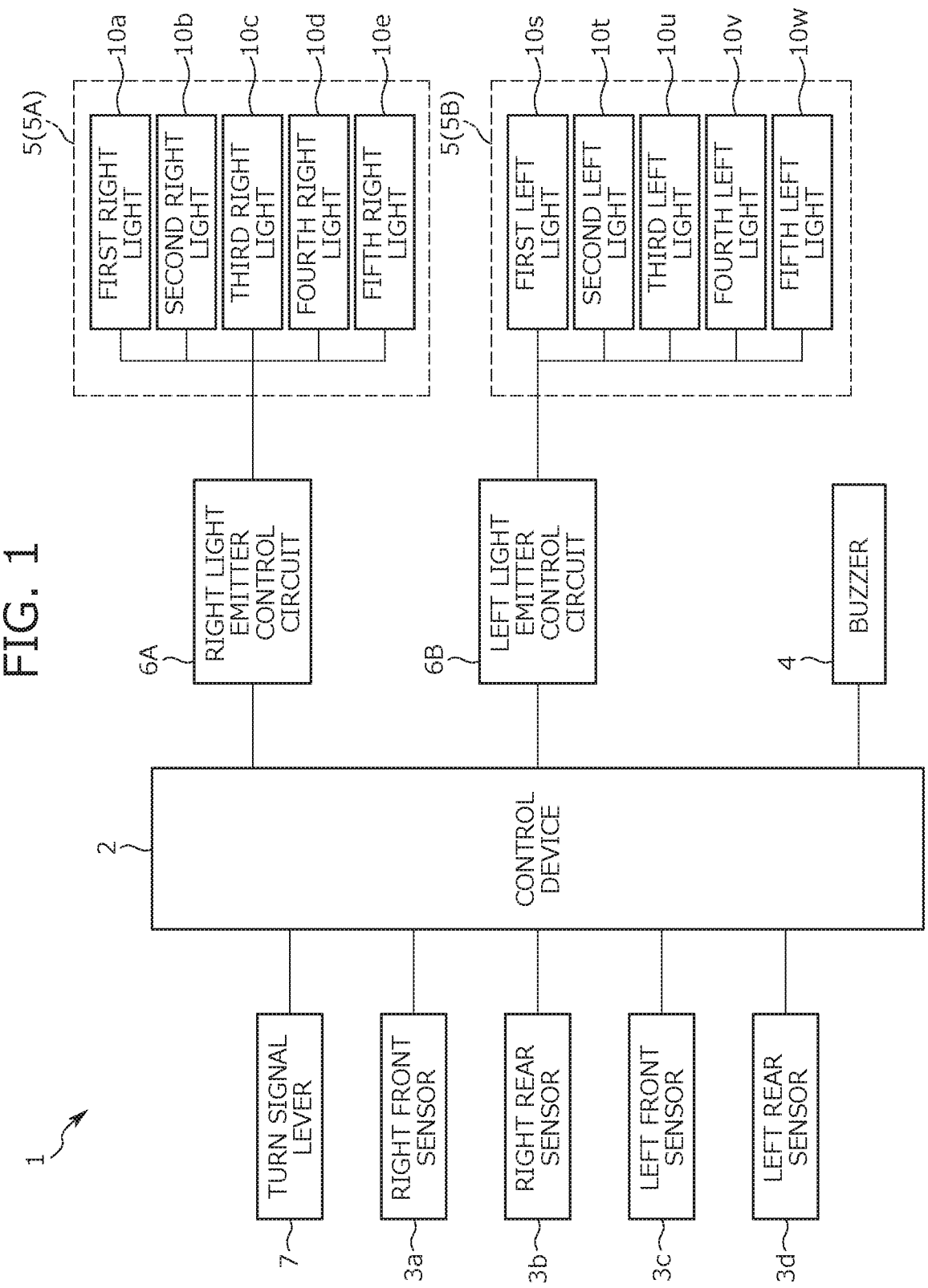
FIG. 1 is a block diagram of a configuration of a conveyance light emitting unit according to one embodiment of the present invention.

Next, an equipment configuration of the vehicle lighting device 1 will be described with reference to FIG. 1. FIG. 1 is a block diagram of the equipment configuration of the vehicle lighting device 1. As illustrated in FIG. 1, the vehicle lighting device 1 has a control device 2, sensors, a buzzer 4, light emitters 5, control circuits, and a turn signal lever 7.

The control device 2 corresponds to a controller, and includes a vehicle electric control unit (ECU). The control device 2 is configured to control the buzzer 4 and the light emitters 5. Moreover, the control device 2 is configured to identify, when the approaching object is detected by the sensor, the position (the relative position) of the approaching object relative to the vehicle V and a movement direction (an approaching direction) of the approaching object. Further, the control device 2 is configured to identify, based on a detection result of the sensor, a distance between the vehicle V and the approaching object and an approaching speed when the approaching object is approaching the vehicle V. The "approaching speed" described herein means the speed of the approaching object relative to the speed of the vehicle V.

Note that the control device 2 according to the present embodiment identifies both of the distance between the vehicle V and the approaching object and the approaching speed when the approaching object is approaching the vehicle V, but only one of the above-described two items may be identified.

The sensor corresponds to a detector, and is configured to detect the approaching object to output a signal corresponding to the detection result to the control device 2. When receiving the output signal from the sensor, the control device 2 identifies, based on the signal, the position of the approaching object relative to the vehicle V, the movement direction (the approaching direction) of the approaching object, the distance between the vehicle V and the approaching object, and the approaching speed of the approaching object.

Figure 2:
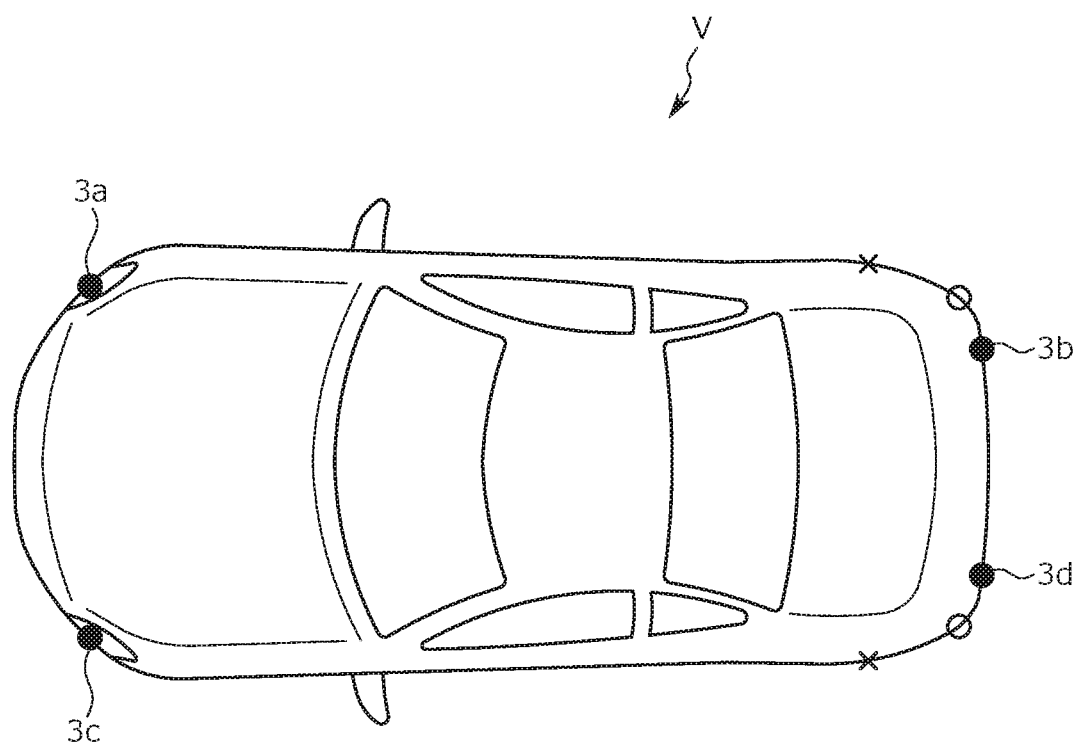
FIG. 2 is a view for describing sensors mounted on a vehicle.

In the present embodiment, the multiple sensors are attached to a vehicle body of the vehicle V as illustrated in FIG. 2. FIG. 2 is a view for describing the sensors mounted on the vehicle V, and schematically illustrates sensor arrangement positions (in the figure, indicated by black circles). The sensors will be described with reference to FIGS. 1 and 2. In the present embodiment, the total of four sensors are each provided on the front, rear, right, and left sides of the vehicle body. That is, a right front sensor 3a, a right rear sensor 3b, a left front sensor 3c, and a left rear sensor 3d are attached to the vehicle body of the vehicle V.

In the present embodiment, each sensor includes a well-known ultrasonic sensor. Note that the present invention is not limited to above, and a sensor including a microwave radar may be used in combination. Note that in the case of using the sensor including the microwave radar, the sensor may be placed in a rear bumper (e.g., a spot indicated by a cross mark in FIG. 2) of the vehicle V.

Moreover, in the present embodiment, the sensors (i.e., the right front sensor 3a and the right rear sensor 3b) at two front spots are arranged symmetrically in a width direction (the right-to-left direction) of the vehicle V, and the sensors (i.e., the left front sensor 3c and the left rear sensor 3d) at two rear spots are arranged symmetrically in the width direction (the right-to-left direction) of the vehicle V, as illustrated in FIG. 2. Note that the present invention is not limited to above, and the number of sensors and the arrangement positions of the sensors may be at least one on each of the front, rear, right, and left sides. For example, sensors may be additionally placed at spots indicated by white circles in FIG. 2.

The buzzer 4 is equipment configured to emit warning sound in the vehicle compartment. Note that the vehicle lighting device 1 according to the present embodiment has the buzzer 4, but does not necessarily have the buzzer 4.

Figure 3:
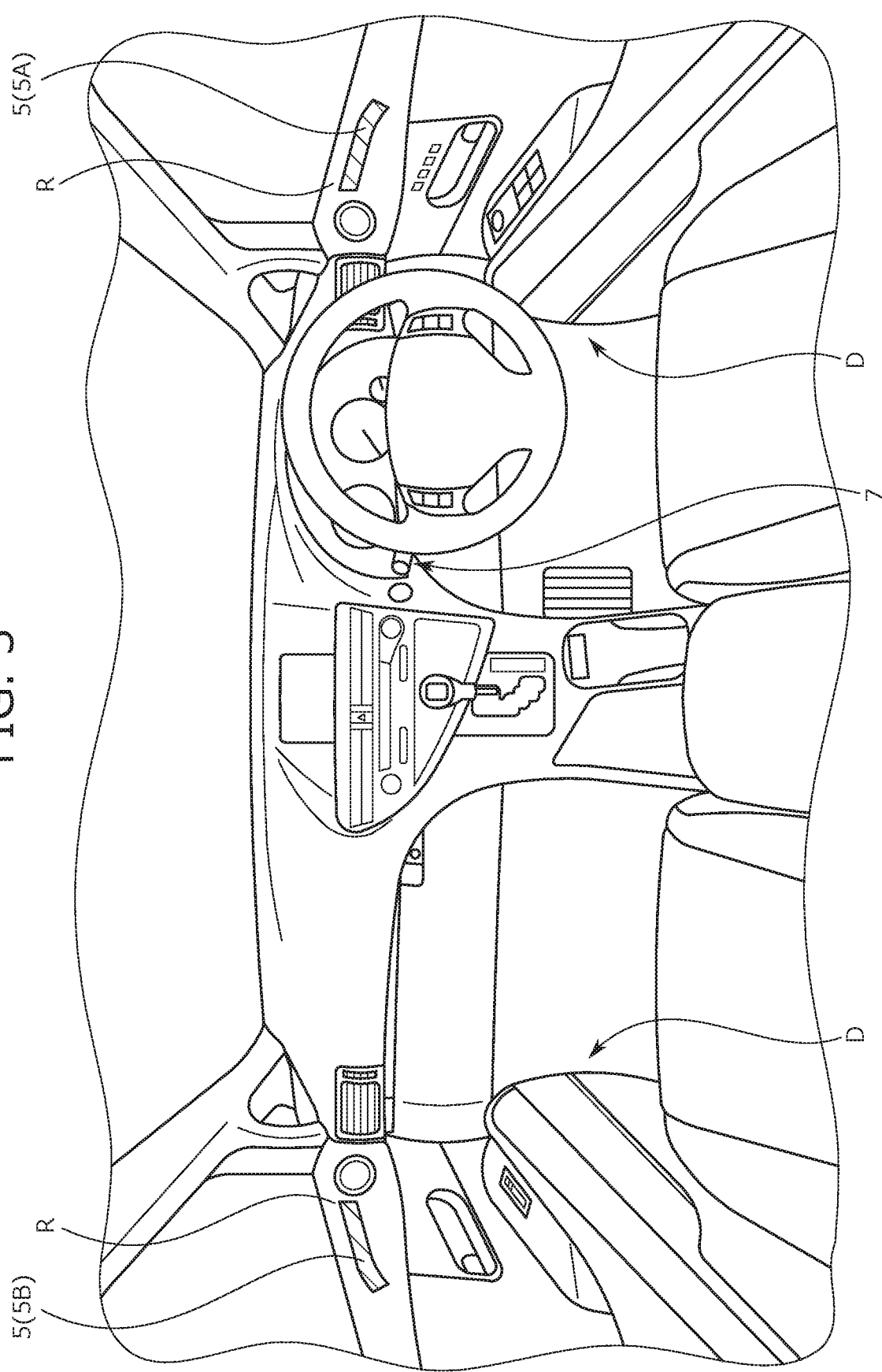
FIG. 3 is a view for describing arrangement of light emitters, and is a view of a front portion of a vehicle compartment.
Figure 4:
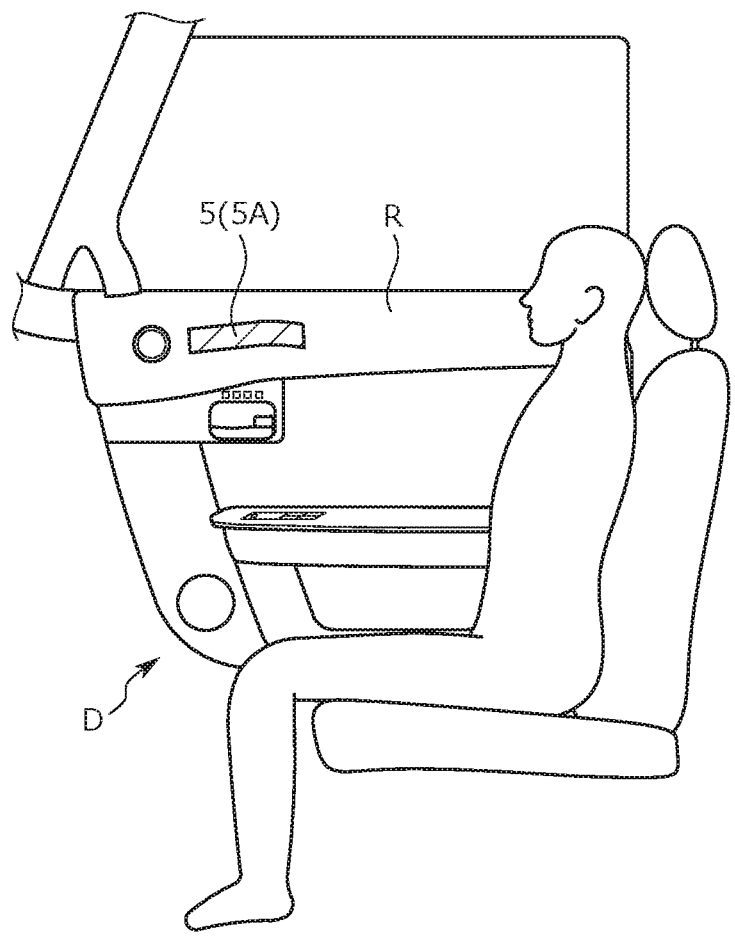
FIG. 4 is a view for describing arrangement of the light emitters, and is a view of a lateral portion of the vehicle compartment.

The light emitters 5 are lighting equipment configured to emit light in the vehicle compartment. In the present embodiment, the multiple light emitters 5 are placed. Hereinafter, the arrangement positions of the light emitters 5 will be described with reference to FIGS. 3 and 4. FIGS. 3 and 4 are views for describing arrangement of the light emitters, FIG. 3 illustrating a front portion of the vehicle compartment and FIG. 4 illustrating a lateral portion of the vehicle compartment. Note that in FIG. 4, equipment (e.g., a steering wheel) present at the periphery of a door is not shown for the sake of convenience in illustration.

In the present embodiment, two light emitters 5 are provided separately from each other in the width direction (the right-to-left direction) of the vehicle V. Precisely, in the present embodiment, one light emitter (hereinafter referred to as a "right light emitter 5A") is arranged at a right end of a front space in the vehicle compartment of the vehicle, and another light emitter (hereinafter referred to as a "left light emitter 5B") is arranged at a left end of the front space, as illustrated in FIG. 3.

The right light emitter 5A and the left light emitter 5B are arranged symmetrically in the right-to-left direction. Moreover, as illustrated in FIG. 4, each light emitter 5 is arranged at a member facing the inside of the vehicle compartment among members forming the door D of the vehicle V, specifically a front portion of a door lining R. More specifically, each light emitter 5 is arranged in the vicinity of a front end portion of a window frame (precisely, a position slightly below the window frame) at the door lining R. Since the light emitter 5 is arranged at such a position, the light emitter 5 is positioned within the peripheral vision of the occupant (precisely, the driver). As a result, the occupant easily recognizes light emission from the light emitter 5.

Note that the arrangement positions of the light emitters 5 are not specifically limited, but may be preferably arrangement positions within the peripheral vision of the occupant. These arrangement positions include, in addition to the front portion of the door lining R, a pillar portion adjacent to a door window, an instrumental panel, and a dashboard, for example.

Figure 5:
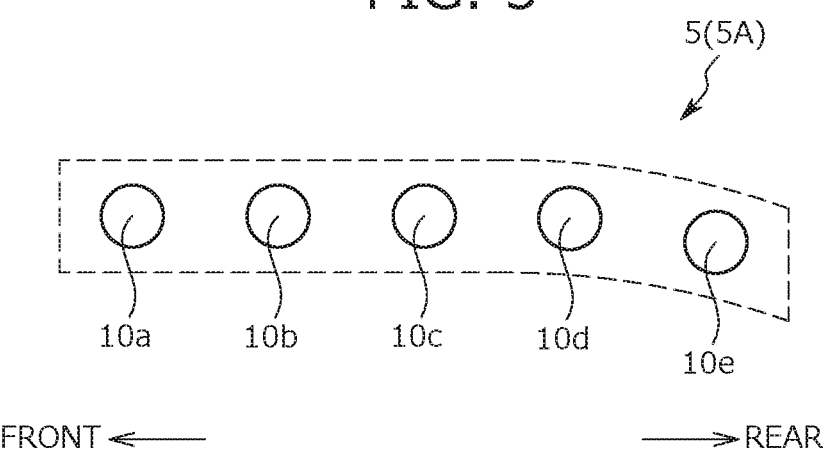
FIG. 5 is a view of a configuration of the light emitter.

A configuration of the light emitter 5 will be described. Each of the right light emitter 5A and the left light emitter 5B includes line illumination type light emitting equipment. Hereinafter, details of the configuration of each light emitter 5 will be described with reference to FIG. 5. FIG. 5 is a view of the configuration of the light emitter 5. Note that in this figure, a configuration of the right light emitter 5A is illustrated, but the left light emitter 5B has a similar configuration except for bilaterally symmetric arrangement.

As illustrated in FIG. 5, each light emitter 5 includes multiple light sources (lights) arranged in line. More specifically, the right light emitter 5A includes five lights (a first right light 10a, a second right light 10b, a third right light 10c, a fourth right light 10d, and a fifth right light 10e), and these lights are arranged along the front-to-rear direction. Similarly, the left light emitter 5B includes five lights (a first left light 10s, a second left light 10t, a third left light 10u, a fourth left light 10v, and a fifth left light 10w), and these lights are arranged along the front-to-rear direction.

Note that in the present embodiment, the line of the lights is in such a shape that a rear portion is gently curved as illustrated in FIG. 5. Note that a light arrangement pattern is not limited to the pattern illustrated in FIG. 5. Moreover, the number of lights included in the light emitter 5 is not limited to five, and an optional number of two or more may be set.

Each light in each light emitter 5 is controlled by the control device 2 via the control circuit. Specifically, the control device 2 controls each light forming the right light emitter 5A via a right light emitter control circuit 6A, and controls each light forming the left light emitter 5B via a left light emitter control circuit 6B.

Moreover, the control device 2 can separately control the lights forming each light emitter 5. More specifically, the control device 2 selects the light to be turned on from the lights forming each light emitter 5, and controls each light emitter 5 such that only such a light is turned on. By such control, a light emitting spot of the light emitter 5 changes (moves).

Further, the control device 2 changes a speed when the light to be turned on among the lights forming each light emitter 5 is switched so that a speed (a movement speed) when the light emitting spot moves can be changed.

In addition, the control device 2 can blink the lights forming each light emitter 5 when these lights are turned on. In this manner, the light emitting spot of the light emitter 5 moves while blinking.

In the present embodiment, each light is a light whose emission color is switchable. Moreover, when turning on the lights forming each light emitter 5, the control device 2 controls the emission color of the lights. By such control, the emission color of the light emitting spot of the light emitter 5 is switched. That is, in the present embodiment, the emission color of the light emitting spot of the light emitter 5 is switchable. Note that a well-known light can be utilized as the light whose emission color is switchable, and description of a mechanism and a structure for switching the emission color will be omitted.

The turn signal lever 7 is operated when the occupant of the vehicle V changes lane, and is configured to output a signal indicating a lane change direction to the control device 2. When receiving the output signal from the turn signal lever 7, the control device 2 identifies the lane change direction based on the signal. Then, when receiving the output signal from the sensor on the same side as the identified lane change direction, the control device 2 recognizes the presence of the approaching subsequent vehicle on the changed lane (precisely, the change target lane). For example, when the control device 2 receives the signal indicating that the lane change direction is a "rightward direction" as the output signal from the turn signal lever 7, if the control device 2 receives the output signal from the right rear sensor 3b, the control device 2 recognizes that the approaching subsequent vehicle is present on the changed lane.

(Light Emission from Light Emitter 5)

Figure 6:
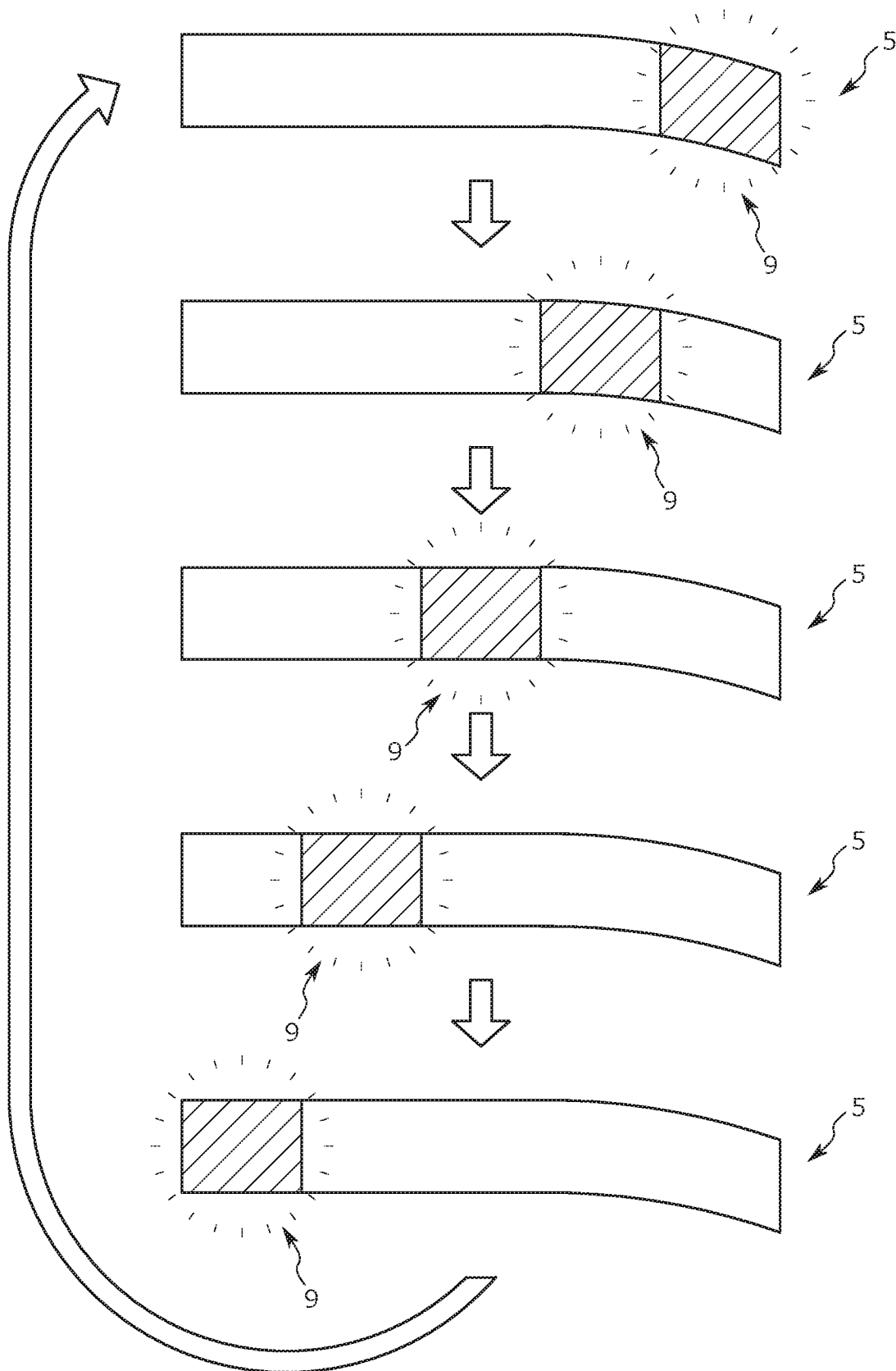
FIG. 6 is a view for describing a light emitting pattern of the light emitter.

Next, light emission from the light emitter 5 will be described. In the present embodiment, the light emitter 5 emits light as illumination for the inside of the vehicle compartment, and emits light to notify the occupant of the presence of the approaching object as described above. Moreover, in the present embodiment, the light emitter 5 emits light such that the light emitting spot moves in a predetermined direction. Hereinafter, a light emitting pattern of the light emitter 5 will be described with reference to FIG. 6. FIG. 6 is a view of one example of the light emitting pattern of the light emitter 5.

When having recognized via the signal received from the sensor that the approaching object is approaching the vehicle V, the control device 2 identifies, based on the output signal from the sensor, the position of the approaching object (precisely, the position of the approaching object relative to the vehicle V) and the approaching direction of the approaching object. Further, the control device 2 identifies, based on the output signal from the sensor, the distance between the vehicle V and the approaching object and the approaching speed of the approaching object.

Then, the control device 2 causes only one, which corresponds to the identified result of the position of the approaching object, of the pair of right and left light emitters 5 to emit light. That is, in a case where the approaching object is positioned on the right side of the vehicle V, the control device 2 causes only the right light emitter 5A to emit light. Conversely, in a case where the approaching object is positioned on the left side of the vehicle V, the control device 2 causes only the left light emitter 5B to emit light.

Moreover, the control device 2 controls the light emitter 5 such that the light emitter 5 targeted for light emission emits light in the light emitting pattern illustrated in FIG. 6. Specifically, the control device 2 controls the light emitter 5 such that the light emitting spot 9 of the light emitter 5 targeted for light emission moves along a direction corresponding to the movement direction (the approaching direction) of the approaching object detected by the sensor.

Hereinafter, the light emitting pattern will be specifically described. The control device 2 turns on one of the lights forming the light emitter 5 targeted for light emission, and controls such a light emitter 5 such that the light to be turned on is sequentially switched along the front-to-rear direction. Accordingly, the light emitting spot 9 of the light emitter 5 moves along the front-to-rear direction (precisely, the direction of arrangement of the lights forming the light emitter 5).

At this point, the light emitting spot 9 moves forward from the rear side, and returns to a rear end of the light emitter 5 after having reached a front end of the light emitter 5. The light emitting spot 9 repeats such movement (forward movement from the rear side).

Note that the movement direction of the light emitting spot 9 as described above is switchable in such a manner that the order of the light to be turned on among the lights forming the light emitter 5 targeted for light emission is reversed in the front-to-rear direction. That is, the control device 2 can control the light emitter 5 such that the light emitting spot 9 moves in the opposite direction (a backward direction from the front side) of the movement direction illustrated in FIG. 6.

In the present embodiment, the control device 2 sets the emission color and movement speed of the light emitting spot 9 upon light emission from the light emitter 5 in the above-described light emitting pattern. Then, the control device 2 controls the light emitter 5 such that the light emitting spot 9 moves at the set movement speed while emitting light in the set emission color.

Specifically, when having recognized via the signal received from the sensor that the approaching object is approaching the vehicle V, the control device 2 identifies the distance between the vehicle V and the approaching object. Then, the control device 2 controls the light emitter 5 such that the light emitting spot 9 moves at the movement speed corresponding to the identified result of the distance. More specifically, the control device 2 controls the light emitter 5 such that the light emitting spot 9 moves faster as the distance decreases and moves slower as the distance increases.

Moreover, the control device 2 controls the light emitter 5 such that the emission color of the light emitting spot 9 changes to a color corresponding to the identified result of the distance. More specifically, the control device 2 determines whether or not the identified result of the distance exceeds a reference value (a value referred upon determination on the degree of approaching of the approaching object). In a case where the identified result of the distance falls below the reference value, the control device 2 controls the light emitter 5 such that the emission color of the light emitting spot 9 is a first emission color (e.g., the color of blue). On the other hand, in a case where the identified result of the distance exceeds the reference value, the control device 2 controls the light emitter 5 such that the emission color of the light emitting spot 9 is a second emission color (e.g., the color of red).

Note that in the present embodiment, the distance between the vehicle V and the approaching object is identified to set the emission color and movement speed of the light emitting spot 9 according to the identified result as described above. However, the present invention is not limited to above. The approaching speed of the approaching object may be identified, and the emission color and movement speed of the light emitting spot 9 may be set according to the identified result. In this case, the control device 2 controls the light emitter 5 such that the light emitting spot 9 moves faster as the approaching speed increases and moves slower as the approaching speed decreases. Moreover, when the control device 2 changes the emission color of the light emitting spot 9 according to the identified result of the approaching speed, if the approaching speed falls below a reference value, the control device 2 controls the light emitter 5 such that the emission color of the light emitting spot 9 is the first emission color. If the approaching speed exceeds the reference value, the control device 2 controls the light emitter 5 such that the emission color of the light emitting spot 9 is the second emission color.

Both of the distance between the vehicle V and the approaching object and the approaching speed of the approaching object may be identified, and the emission color and movement speed of the light emitting spot 9 may be set according to both identified results.

Further, in the present embodiment, each light emitter 5 can emit light such that the light emitting spot 9 moves while blinking. Moreover, the control device 2 can control the light emitter 5 such that the light emitting spot 9 moves while blinking at a blinking speed corresponding to the identified result of at least one item of the distance between the vehicle V and the approaching object and the approaching speed of the approaching object.

<<Flow of Control of Light Emitter 5 by Control Device 2>>

Figure 7:
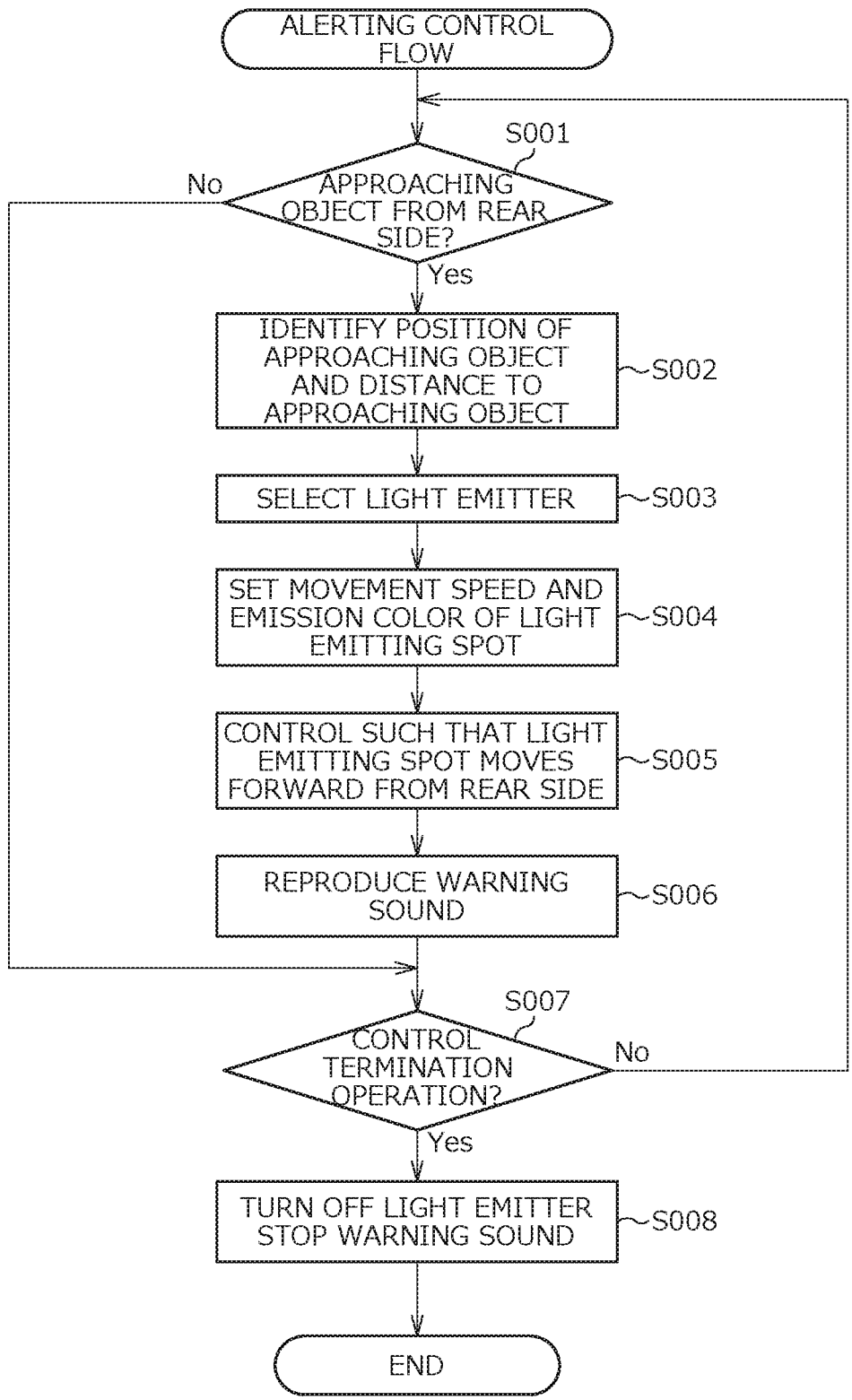
FIG. 7 is a flowchart of an alerting control flow.

Next, the flow of control of the light emitter 5 by the control device 2 will be described. In the present embodiment, when the occupant of the vehicle V operates the turn signal lever 7 to change lane, the control device 2 takes such operation as a trigger to control the light emitter 5 by performing an alerting control flow illustrated in FIG. 7. FIG. 7 is a flowchart of the alerting control flow. Hereinafter, the alerting control flow will be described with reference to FIG. 7.

First, in the alerting control flow, the control device 2 determines, via the presence or absence of the output signal received from the sensor, whether or not the approaching object (specifically, the approaching subsequent vehicle) from the rear side is present (S001). Specifically, the control device 2 identifies the lane change direction based on the output signal from the turn signal lever 7. Thereafter, when one of the right rear sensor 3b or the left rear sensor 3d on the same side as the identified lane change direction detects the approaching subsequent vehicle, the signal is output from such a sensor to the control device 2. When receiving such a signal, the control device 2 determines that the approaching subsequent vehicle is present on the changed lane.

Then, in a case where the control device 2 determines, at the step S001, that the approaching subsequent vehicle is present, the processing proceeds to a step S002. In a case where the control device 2 determines that the approaching subsequent vehicle is not present, the processing proceeds to a step S007.

At the step S002, the control device 2 identifies, based on the output signal from the sensor, the position (the position relative to the vehicle V) of the approaching subsequent vehicle and the distance between the vehicle V and the approaching subsequent vehicle. Thereafter, the control device 2 selects one, which corresponds to the identified result of the position of the approaching subsequent vehicle, of the pair of right and left light emitters 5 (S003). The light emitter 5 selected at the step S003 is the light emitter 5 targeted for light emission (i.e., targeted for control by the control device 2) in subsequent light emitting operation.

Moreover, according to the result of the distance identified at the step S002, the control device 2 sets the movement speed and emission color of the light emitting spot 9 upon light emission from the light emitter 5 (S004). More specifically, the control device 2 calculates the movement speed of the light emitting spot 9 in such a manner that the distance as a parameter is substituted into a predetermined calculation formula. At this point, a higher movement speed is calculated as the distance decreases, and a lower movement speed is calculated as the distance increases. Moreover, the control device 2 compares the identified result of the distance and the reference value. In a case where the distance falls below the reference value, the emission color is set to the first emission color. In a case where the distance exceeds the reference value, the emission color is set to the second emission color.

Then, after the movement speed and emission color of the light emitting spot 9 have been set, the control device 2 controls the light emitter 5 targeted for light emission such that the light emitting spot 9 moves along the direction corresponding to the movement direction (the approaching direction) of the approaching object (S005). More specifically, the light emitter 5 is controlled such that the light emitting spot 9 emits light in the emission color set at the step S004 while moving forward from the rear side at the movement speed similarly set at the step S004.

Note that when the light emitter 5 is controlled at the step S004, the light emitter 5 may be controlled such that the light emitting spot 9 moves while blinking. At this point, when the light emitter 5 is controlled such that the light emitting spot 9 moves while blinking at the blinking speed corresponding to the distance (the distance between the vehicle V and the approaching subsequent vehicle) identified at the step S002, the occupant (the driver) of the vehicle V easily grasps the status (specifically, the degree of approaching) of the approaching subsequent vehicle.

Further, the control device 2 reproduces the warning sound via the buzzer 4 while the light emitter 5 is emitting light in the above-described light emitting form (S006). The warning sound described herein is sound for notifying the occupant (the driver) of the vehicle V of light emission from the light emitter 5.

Thereafter, until control termination operation is performed, the control device 2 repeats a series of steps S001 to S006 as described above (S007). The control termination operation described herein is operation performed by the occupant as the operation of terminating the alerting control flow. Specifically, such operation corresponds to the operation of returning the turn signal lever 7 to an original position (a normal position).

Then, once the control device 2 recognizes that the control termination operation is performed and received, the control device 2 turns off the light emitter 5, and controls the buzzer 4 to stop the warning sound (S008). When the step S008 ends, the alerting control flow ends. Note that in a case where the control termination operation is performed before detection of the approaching subsequent vehicle (i.e., No at the step S001, and Yes at the step S007), the alerting control flow ends without performing the step S008.

As described above, in the alerting control flow, when the occupant of the vehicle V changes lane, if the sensor detects the approaching subsequent vehicle on the changed lane, the light emitter 5 (in other words, the light emitter 5 arranged on the same side as the approaching subsequent vehicle as viewed from the vehicle V) positioned on the same side as the lane change direction emits light. At this point, the light emitter 5 emits light such that the light emitting spot 9 moves forward from the rear side in the front-to-rear direction. Accordingly, the occupant (the driver) of the vehicle V visually recognizes movement (the flow) of the light emitting spot 9 to recognize the presence of the approaching subsequent vehicle on the changed lane, i.e., the approaching direction of the object approaching the vehicle V on the changed lane.

Note that the light emitter 5 emits light such that the light emitting spot 9 moves forward from the rear side, and therefore, the occupant intuitively grasps the presence of the approaching subsequent vehicle. Moreover, in the alerting control flow, the light emitting form (specifically, the movement speed and emission color of the light emitting spot 9) of the light emitter 5 is changed according to the identified result of the distance between the vehicle V and the approaching object. Accordingly, the occupant easily recognizes a change in the light emitting form, and grasps the degree of approaching of the approaching object from the changed light emitting form.

Moreover, in the present embodiment, only one of the pair of right and left light emitters 5 on the same side as the lane change direction emits light, and therefore, the occupant accurately grasps the approaching direction of the approaching object and the position (precisely, which one of the left and right sides of the vehicle V the approaching object is positioned) of the approaching object.

<<Conveyance Light Emitting Unit according to Variations>>

In the above-described embodiment (i.e., the present embodiment), the vehicle lighting device 1 configured to notify the occupant of the presence of the approaching subsequent vehicle on the changed lane upon lane change by light emission from the light emitter 5 has been described as one example of the conveyance light emitting unit of the present invention. Note that other embodiments of the conveyance light emitting unit of the present invention are also conceivable. Hereinafter, three embodiments (a first variation, a second variation, and a third variation) will be described by way of example as variations of the conveyance light emitting unit of the present invention.

Note that in each of the variations described below, the vehicle lighting device will be described as an example of the conveyance light emitting unit as in the above-described embodiment. Moreover, in each of the variations, differences from the above-described embodiment will be mainly described, and description of points common to the above-described embodiment will be omitted.

(1) First Variation

Figure 8:
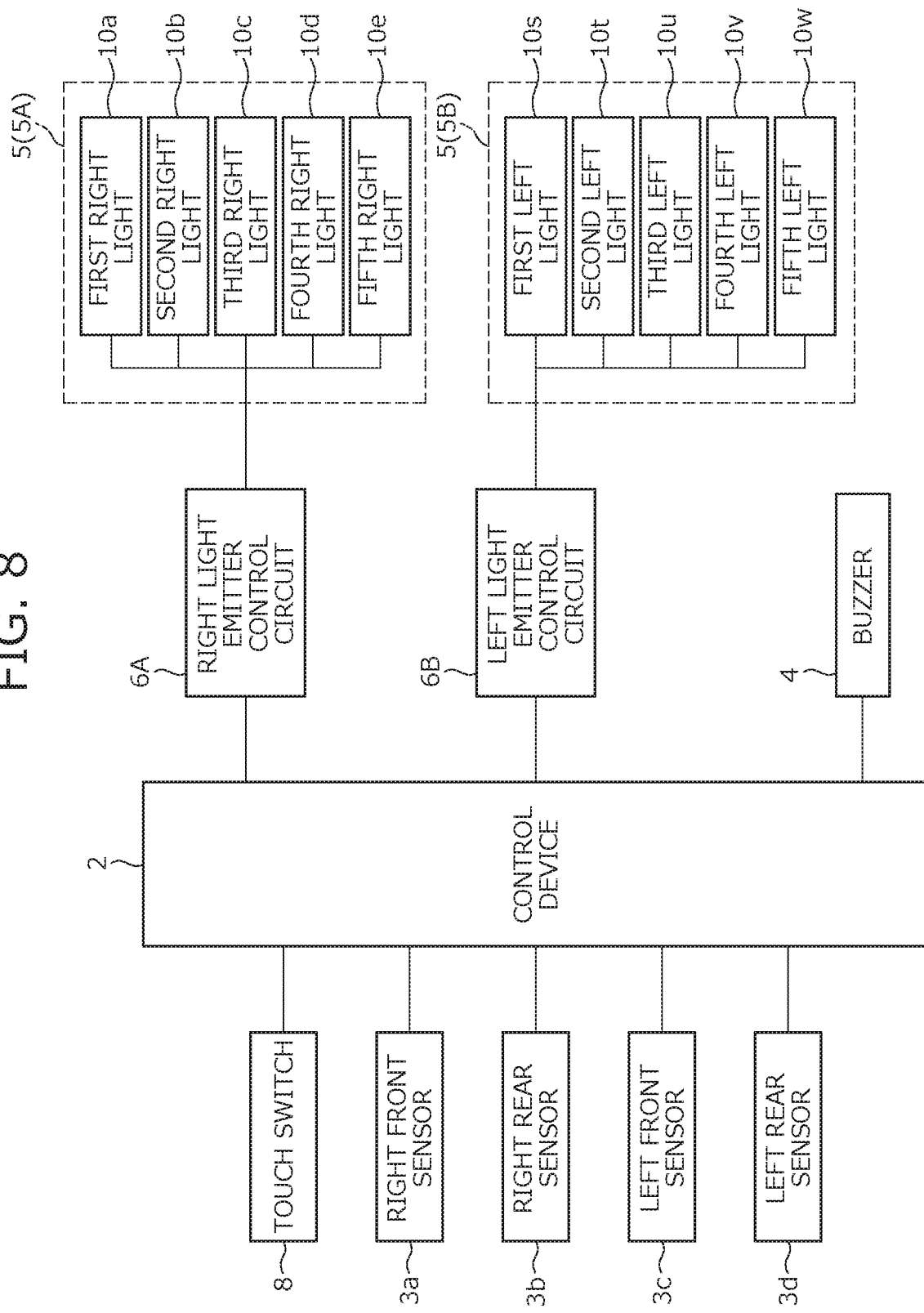
FIG. 8 is a block diagram of a configuration of a conveyance light emitting unit according to a first variation.

A vehicle lighting device 1x according to the first variation is configured to notify the occupant of the presence of the approaching subsequent vehicle on a door D side by light emission from the light emitter 5 when the vehicle V is in a stop state and the occupant in the vehicle V opens the door D. A configuration of the vehicle lighting device 1x according to the first variation will be described with reference to FIG. 8. Such a configuration is common to the configuration (i.e., the configuration of the vehicle lighting device 1 according to the present embodiment) illustrated in FIG. 1, except that a touch switch 8 is provided instead of the turn signal lever 7. FIG. 8 is a block diagram of the configuration of the vehicle lighting device 1x according to the first variation.

The touch switch 8 is placed at a door knob of each door D provided at the vehicle V. The occupant touches the door knob to operate the touch switch 8. At this point, the touch switch 8 outputs a signal to the control device 2. When receiving the output signal from the touch switch 8, the control device 2 identifies the door D targeted for opening based on the signal. Then, when receiving the output signal from the sensor on the same side as the door D targeted for opening, the control device 2 recognizes the presence of the approaching subsequent vehicle on the door D side. For example, when the control device 2 receives the signal from the touch switch 8 placed at the door knob of the right door D, if the control device 2 receives the output signal from the right rear sensor 3b, the control device 2 recognizes the presence of the approaching subsequent vehicle on the side of the door D targeted for opening.

Then, in the first variation, when recognizing the presence of the approaching subsequent vehicle on the side of the door D targeted for opening, the control device 2 identifies the position of the approaching subsequent vehicle. In addition, the control device 2 controls one, which corresponds to the identified position of the approaching subsequent vehicle, of the pair of right and left light emitters 5 to emit light. That is, in the first variation, when the approaching subsequent vehicle is present on the side of the door D targeted for opening, the control device 2 executes the alerting control flow, thereby causing the light emitter 5 to emit light.

Note that when the occupant touches the door knob of the door D targeted for opening to operate the touch switch 8, such operation is taken as a trigger to start the alerting control flow according to the first variation, and the alerting control flow is performed by steps substantially similar to those of the alerting control flow illustrated in FIG. 7. Note that in the alerting control flow of the first variation, operation in which the occupant releases the hand from the door knob corresponds to the control termination operation. That is, in the first variation, when the occupant releases the hand from the door knob to turn off the touch switch 8, the alerting control flow ends.

Moreover, during the alerting control flow according to the first variation, at the step of emitting light from the light emitter 5 (the step corresponding to the step S005 of FIG. 7), the light emitter 5 (one light emitter 5 corresponding to the position of the approaching subsequent vehicle) is controlled such that the light emitting spot 9 of the light emitter 5 moves forward from the rear side. Accordingly, the occupant of the vehicle V visually recognizes movement (the flow) of the light emitting spot 9 to intuitively grasp the approaching subsequent vehicle approaching the door D targeted for opening, i.e., the approaching direction of the object approaching the door D targeted for opening.

(2) Second Variation

A vehicle lighting device according to the second variation is configured to notify, in a case where the object (the approaching object) approaching the vehicle V from the front of the vehicle V is present while the vehicle V is traveling forward, the presence of the object by light emission from the light emitter 5. More specifically, in the second variation, while the vehicle V is traveling in an urban area during, e.g., night or raining, if a bicycle (precisely, a light-off bicycle hereinafter referred to as an "approaching bicycle") is approaching the vehicle V from the front thereof, the approaching bicycle is detected by the sensor, and the light emitter 5 further emits light to notify the presence of the approaching bicycle.

A configuration of the vehicle lighting device according to the second variation is substantially common to the configuration (i.e., the configuration of the vehicle lighting device 1 according to the present embodiment) illustrated in FIG. 1.

In the second variation, when the sensor (more specifically, the right front sensor 3a or the left front sensor 3c) detects the approaching bicycle, the control device 2 identifies the position of the approaching bicycle. In addition, the control device 2 controls one, which corresponds to the identified position of the approaching bicycle, of the pair of right and left light emitters 5 to emit light. That is, in the second variation, when the approaching bicycle is present, the control device 2 executes the alerting control flow, thereby causing the light emitter 5 to emit light.

Figure 9:
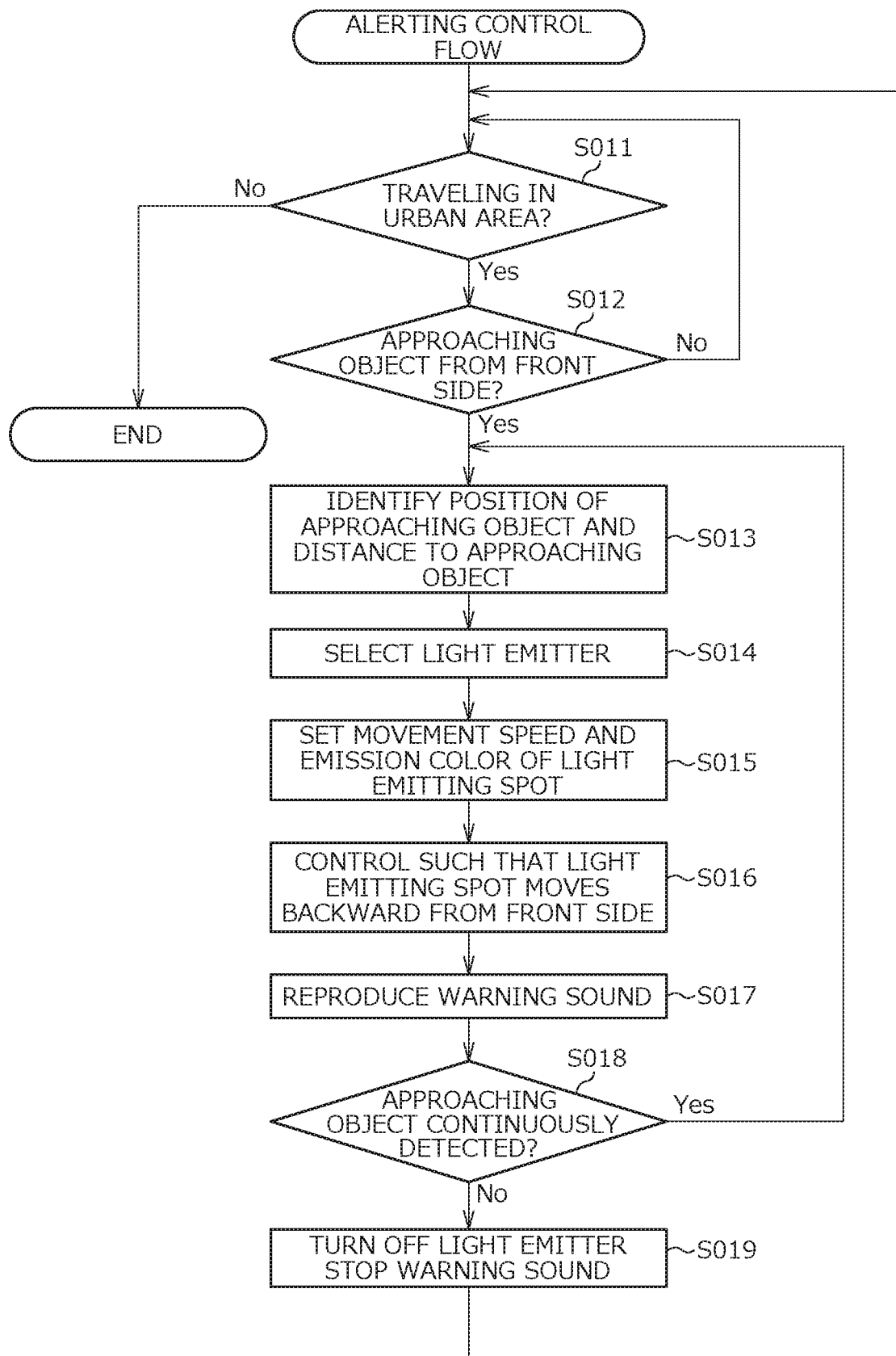
FIG. 9 is a flowchart of an alerting control flow according to a second variation.

Hereinafter, the alerting control flow according to the second variation will be described with reference to FIG. 9. FIG. 9 is a flowchart of the alerting control flow according to the second variation. When the vehicle V enters the urban area, the control device 2 takes such entrance as a trigger to execute the alerting control flow illustrated in FIG. 9, thereby controlling the light emitter 5. Note that entrance of the vehicle V into the urban area is sensed via the function of a not-shown car navigation system or GPS mounted on the vehicle V.

In the alerting control flow according to the second variation, the control device 2 first identifies the current position of the vehicle V via the function of the car navigation system or the GPS, and determines whether or not the vehicle V is traveling in the urban area (S011). In a case where it is determined that the vehicle V is traveling in the urban area, the control device 2 determines, via the presence or absence of the output signal received from the sensor, whether or not the approaching bicycle is present (S012). Specifically, when any of the right front sensor 3a and the left front sensor 3c detects the approaching bicycle, the signal is output from the sensor to the control device 2. When receiving such a signal, the control device 2 determines that the approaching bicycle is present.

Then, in a case where the control device 2 determines, at the step S012, that the approaching bicycle is present, the processing transitions to a step S013. In a case where the control device 2 determines that the approaching bicycle is not present, the processing returns to the step S011.

At the step S013, the control device 2 identifies, based on the output signal from the sensor, the position (the position relative to the vehicle V) of the approaching bicycle and the distance between the vehicle V and the approaching bicycle. Thereafter, the control device 2 selects one, which corresponds to the identified result of the position of the approaching bicycle, of the pair of right and left light emitters 5 (S014). The light emitter 5 selected at the step S014 is the light emitter 5 targeted for light emission (i.e., targeted for control by the control device 2) in subsequent light emitting operation.

Moreover, according to the result of the distance identified at the step S013, the control device 2 sets the movement speed and emission color of the light emitting spot 9 upon light emission from the light emitter 5 (S015). The step S015 is performed in a manner similar to that of the step S004 of the alerting control flow (i.e., the alerting control flow according to the present embodiment) illustrated in FIG. 7. That is, a higher movement speed of the light emitting spot 9 is calculated as the distance decreases, and a lower movement speed of the light emitting spot 9 is calculated as the distance increases. Moreover, the emission color of the light emitting spot 9 is set to the first emission color in a case where the distance falls below the reference value, and is set to the second emission color in a case where the distance exceeds the reference value.

Then, after the movement speed and emission color of the light emitting spot 9 have been set, the control device 2 controls the light emitter 5 targeted for light emission such that the light emitting spot 9 moves along the direction corresponding to the movement direction (the approaching direction) of the approaching bicycle (S016). More specifically, the light emitter 5 is controlled such that the light emitting spot 9 emits light in the emission color set at the step S015 while moving backward from the front side at the movement speed similarly set at the step S015. Further, the control device 2 reproduces the warning sound via the buzzer 4 while the light emitter 5 is emitting light in the above-described light emitting form (S017).

Thereafter, as long as the approaching bicycle is continuously detected, the control device 2 repeats the steps S013 to S017 as described above (S108). Then, once the approaching bicycle is no longer detected, the control device 2 turns off the light emitter 5, and controls the buzzer 4 to stop the warning sound (S109).

A series of steps S011 to S019 described above is repeated as needed while the vehicle V is traveling in the urban area. Once the vehicle V leaves the urban area, the alerting control flow according to the second variation ends.

As described above, in the alerting control flow according to the second variation, while the vehicle V is traveling in the urban area during night or raining, if the bicycle (the approaching bicycle) approaching the vehicle V from the front thereof is detected by the sensor, the light emitter 5 positioned on the same side as the approaching bicycle emits light. At this point, the light emitter 5 emits light such that the light emitting spot 9 moves backward from the front side in the front-to-rear direction. Accordingly, the occupant (the driver) of the vehicle V visually recognizes movement (the flow) of the light emitting spot 9 to intuitively grasp the presence of the approaching bicycle.

(3) Third Variation

A vehicle lighting device according to the third variation is configured to notify the presence of the object (the approaching object) approaching the vehicle V from the lateral side of the vehicle V by light emission from the light emitter 5 in a case where the object is present while the vehicle V is traveling forward. More specifically, in the third variation, while the vehicle V is traveling in a predetermined area (e.g., the periphery of an intersection with poor visibility), when, e.g., a person or a bicycle (hereinafter, a "laterally-approaching object") is laterally approaching the vehicle V, the laterally-approaching object is detected by the sensor, and the light emitter 5 further emits light to notify the presence of the approaching bicycle.

Figure 10:
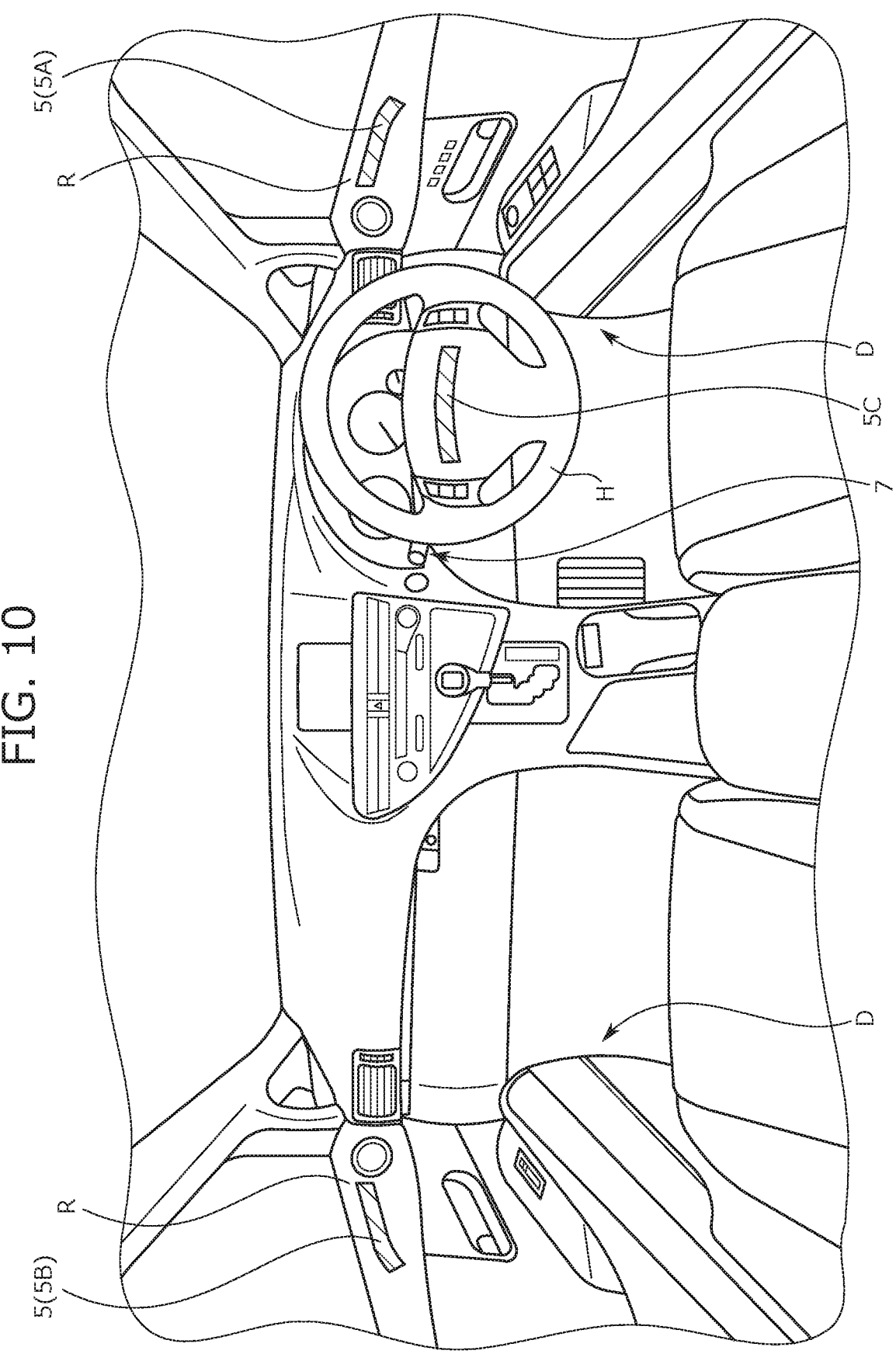
FIG. 10 is a view of arrangement of light emitters in a conveyance light emitting unit according to a third variation.

A configuration of the vehicle lighting device according to the third variation will be described. The third variation is different from each of the above-described embodiments in that a third light emitter 5C is further provided in addition to the pair of right and left light emitters 5. The third light emitter 5C will be described. As illustrated in FIG. 10, the third light emitter 5C is attached to the steering wheel W, for example. FIG. 10 is a view of arrangement of the light emitters 5 in the vehicle lighting device according to the third variation.

Moreover, the third light emitter 5C includes line illumination type light emitting equipment as in the pair of right and left light emitters 5 (i.e., the right light emitter 5A and the left light emitter 5B), and includes multiple light sources (lights) arranged in line. Moreover, the lights forming the third light emitter 5C are arranged along the right-to-left direction (the width direction of the vehicle V).

Figure 11:
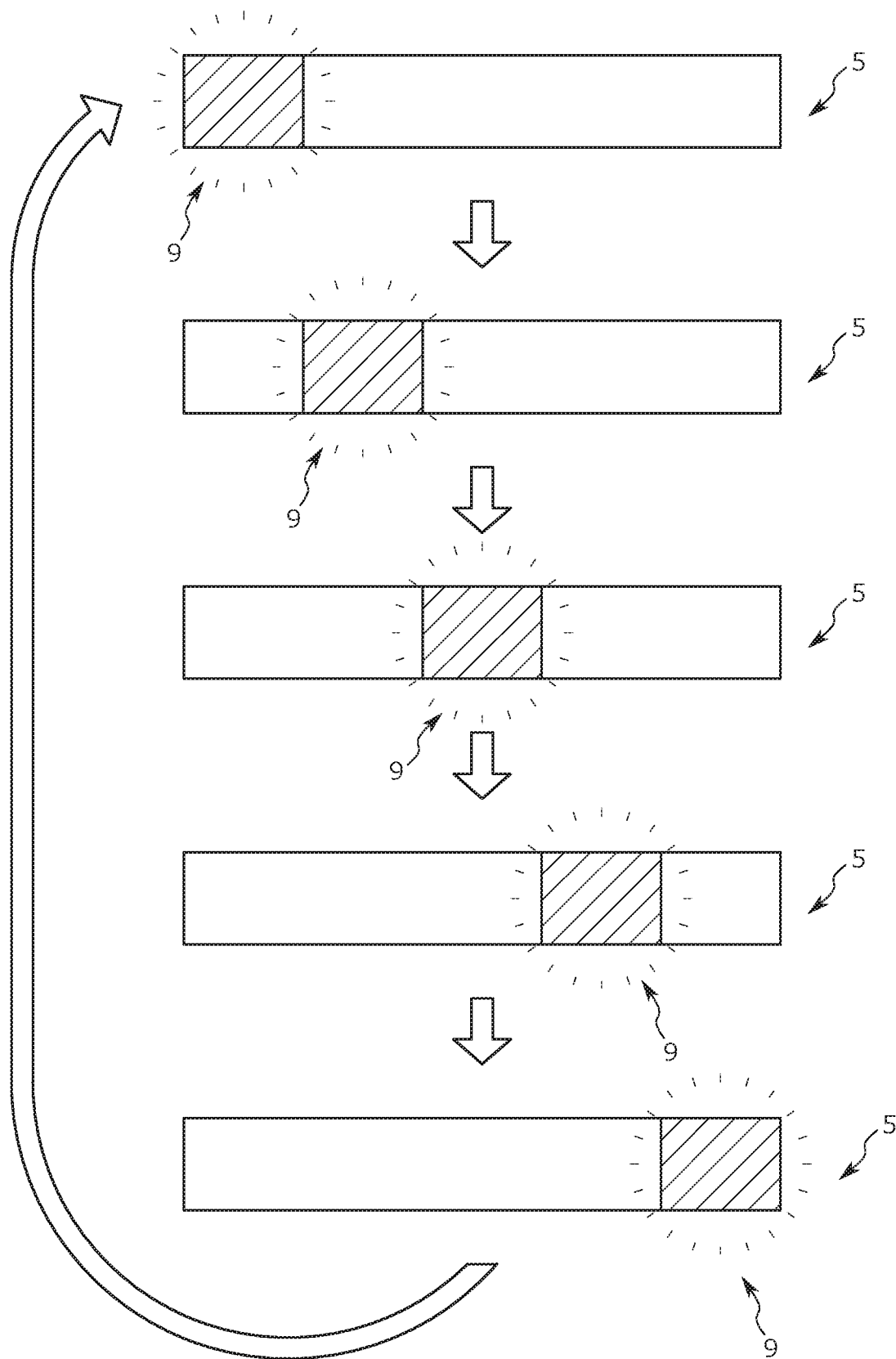
FIG. 11 is a view for describing a light emitting pattern of the light emitter according to the third variation.

Thus, when the control device 2 controls the third light emitter 5C to emit light, if it is controlled such that the light to be turned on among the lights forming the third light emitter 5C is sequentially switched in the right-to-left direction, a light emitting spot 9 of the third light emitter 5C moves along the right-to-left direction as illustrated in FIG. 11. FIG. 11 is a view for describing a light emitting pattern of the third light emitter 5C. Note that FIG. 11 illustrates a case where the light emitting spot 9 moves from the left side to the right side, but the control device 2 according to the third variation can control the third light emitter 5C such that the light emitting spot 9 moves from the left side to the right side, and can control the third light emitter 5C such that the light emitting spot 9 moves from the right side to the left side.

In the third variation, when the sensor detects the laterally-approaching object, the control device 2 identifies the position and approaching direction of the laterally-approaching object, and controls the third light emitter 5C such that the light emitting spot 9 of the third light emitter 5C moves in the direction corresponding to the approaching direction of the laterally-approaching object. Specifically, in a case where the laterally-approaching object is approaching the vehicle V from the left side, the control device 2 controls the third light emitter 5C such that the light emitting spot 9 moves from the left side to the right side. In a case where the laterally-approaching object is approaching the vehicle V from the right side, the control device 2 controls the third light emitter 5C such that the light emitting spot 9 moves from the right side to the left side.

As described above, in the third variation, the alerting control flow is performed for the purpose of notifying the occupant of the presence of the laterally-approaching object. That is, in the alerting control flow according to the third variation, the occupant of the vehicle V visually recognizes movement (the flow) of the light emitting spot 9 of the third light emitter 5C to intuitively grasp the presence and approaching direction of the laterally-approaching object. Note that the alerting control flow according to the third variation is performed by steps according to the alerting control flow according to the second variation illustrated in FIG. 9.

<<Other Embodiments of Conveyance Light Emitting Unit>>

The conveyance light emitting unit of the present invention has been described above with reference to the specific embodiment (hereinafter referred to as a "first embodiment"). Hereinafter, second to fourth embodiments will be described as other embodiments of the conveyance light emitting unit. Note that the same reference numerals as those in the first embodiment are used to represent configurations common to those of the first embodiment in each of the second to fourth embodiments, and description thereof will be omitted.

Second Embodiment

According to the second embodiment, a conveyance light emitting unit capable of accurately notifying an occupant of a conveyance about a conveyance traveling direction, specifically a traveling direction when the conveyance is traveling backward, is implemented. A vehicle lighting device 1y according to the present embodiment is configured to notify a driver of the traveling direction of the vehicle V via light emission from a light emitter 5 provided in a vehicle compartment when the vehicle V reverses (travels backward) for parking. Moreover, in a case where an object (hereinafter referred to as an "approaching object") is rapidly approaching the vehicle V during reversing of the vehicle V, the presence of the approaching object is similarly notified to the driver via light emission from the light emitter 5. In the second embodiment, the "approaching object" is an object approaching the vehicle V upon parking, such as outer walls defining parking spaces, other parked vehicles, and pedestrians, and is an object moving relative to the vehicle V.

Figure 12:
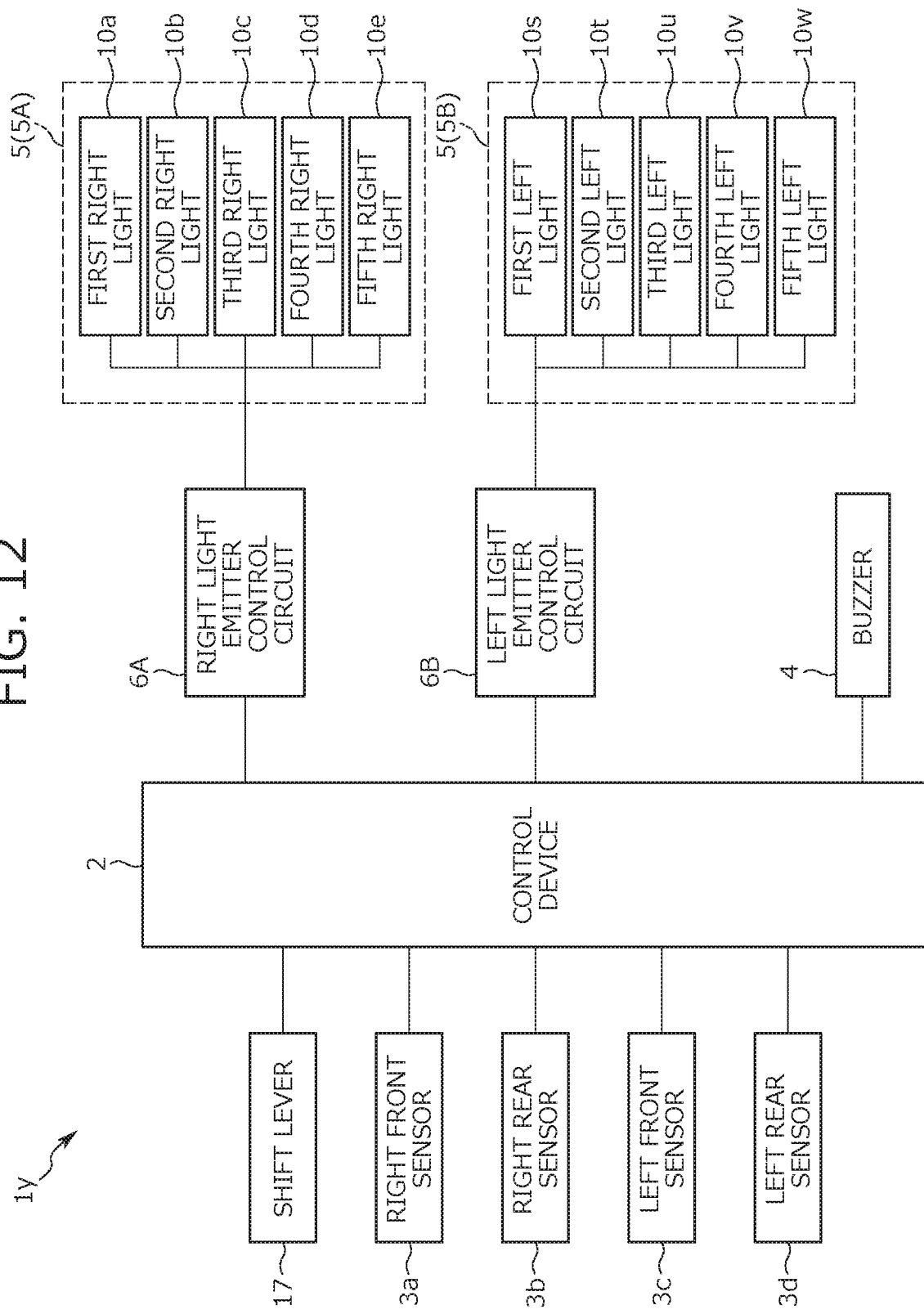
FIG. 12 is a block diagram of a configuration of a conveyance light emitting unit according to a second embodiment.

An equipment configuration of the vehicle lighting device 1y according to the second embodiment will be described with reference to FIG. 12. FIG. 12 is a block diagram of the equipment configuration of the vehicle lighting device 1y according to the second embodiment. As illustrated in FIG. 12, the vehicle lighting device 1y has a control device 2, sensors, a buzzer 4, light emitters 5, control circuits, and a shift lever 17. The control device is configured to control the buzzer 4 and the light emitters 5 and identify the traveling direction of the vehicle V. Moreover, the control device 2 is configured to identify, when the approaching object is detected by the sensor, the position (the relative position) of the approaching object relative to the vehicle V, a distance between the vehicle V and the approaching object, and an approaching speed when the approaching object is approaching the vehicle V.

Each light of each light emitter 5 is controlled by the control device 2 via the control circuit. Moreover, the control device 2 can separately control the lights forming each light emitter 5. More specifically, the control device 2 selects the light to be turned on from the lights forming each light emitter 5, and controls each light emitter 5 such that only such a light is turned on. By such control, a light emitting spot of the light emitter 5 changes (moves).

On the other hand, the control device 2 can simultaneously control all of the lights forming each light emitter 5. More specifically, the control device 2 controls each light emitter 5 such that all of the lights forming the light emitter 5 are simultaneously turned on or off. By such control, the light emitting spot of the light emitter 5 blinks.

Moreover, the control device 2 controls the emission color of the lights forming each light emitter 5 when each of these lights is turned on. By such control, the emission color of the light emitting spot of the light emitter 5 is switched. That is, in the second embodiment, the emission color of the light emitting spot of the light emitter 5 is variable as in the first embodiment.

The occupant operates the shift lever 17 to switch operation/stop of the vehicle V and the traveling direction of the vehicle V, and the shift lever 17 outputs a signal indicating a lever position (hereinafter also referred to as a "shift position") after operation to the control device 2. When receiving the output signal from the shift lever 17, the control device 2 identifies the traveling direction of the vehicle V based on the signal. For example, in a case where the shift position is "R (Reverse)," the control device identifies that the vehicle V is moving (traveling) backward.

Figure 13:
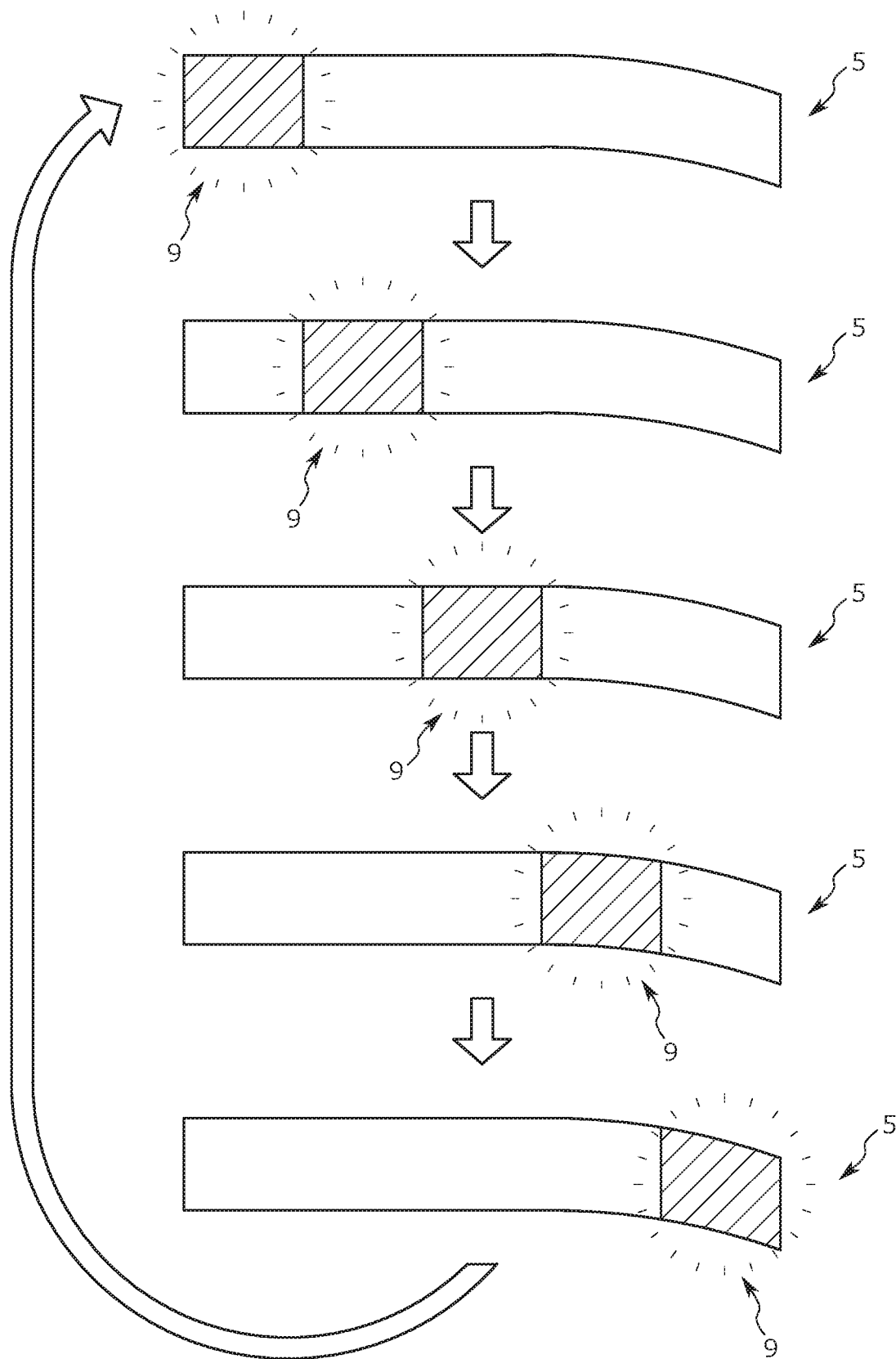
FIG. 13 is a view of a light emitting pattern of a light emitter in the case of notifying a traveling direction of a vehicle in the second embodiment.
Figure 14:
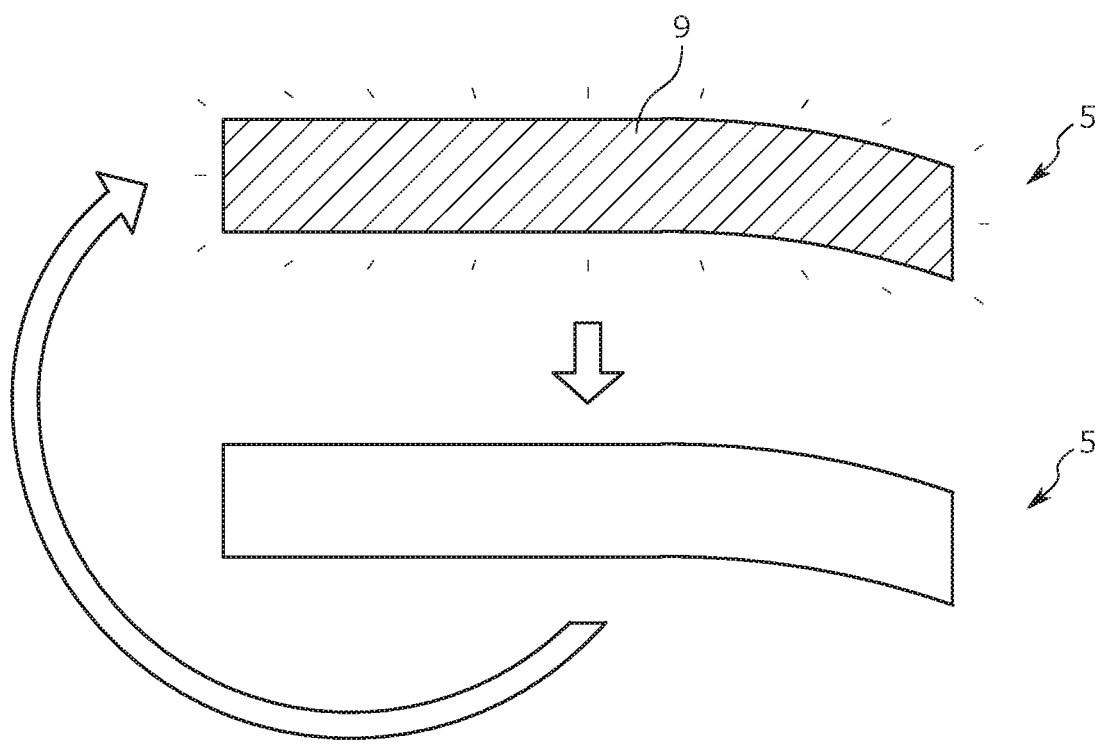
FIG. 14 is a view of a light emitting pattern of the light emitter in the case of notifying that an object is approaching the vehicle in the second embodiment.

In the second embodiment, the light emitter 5 emits light as illumination for the inside of the vehicle compartment, and emits light to notify the occupant of the traveling direction of the vehicle V and the presence of the approaching object. Moreover, a light emitting pattern of the light emitter 5 includes a pattern in the case of notifying the traveling direction of the vehicle V, and a pattern in a case where the approaching object is rapidly approaching the vehicle V. Hereinafter, the light emitting pattern of the light emitter 5 will be described with reference to FIGS. 13 and 14. FIG. 13 is a view of the light emitting pattern of the light emitter 5 in the case of notifying the traveling direction of the vehicle V in the second embodiment. FIG. 14 is a view of the light emitting pattern of the light emitter 5 in the case of notifying that the approaching object is approaching the vehicle V in the second embodiment.

In the case of notifying the traveling direction of the vehicle V, the control device 2 identifies the traveling direction of the vehicle V based on the shift position. In the present embodiment, when backward movement (traveling) of the vehicle V is identified, the control device 2 controls the light emitter 5 such that light is emitted in the pattern (hereinafter referred to as a "first light emitting pattern")

illustrated in FIG. 13. Specifically, the control device 2 controls the light emitter 5 such that the light emitting spot 9 of the light emitter 5 moves along a direction corresponding to the identified traveling direction of the vehicle V.

The first light emitting pattern will be described in detail. The control device 2 turns on one of the lights forming a right light emitter 5A, and controls the light emitter 5A such that the light to be turned on is sequentially switched along the front-to-rear direction. Accordingly, the light emitting spot 9 of the light emitter 5A moves along the front-to-rear direction (precisely, the direction of arrangement of the lights forming the right light emitter 5A). At this point, the light emitting spot 9 moves backward from the front side, and returns to a front end of the light emitter 5A after having reached a rear end of the light emitter 5A. The light emitting spot 9 repeats such movement (backward movement from the front side).

Note that when the right light emitter 5A emits light in the first light emitting pattern, the control device 2 controls the light emitter 5A such that the emission color of the light emitting spot 9 is a first emission color (in the present embodiment, the color of blue). The emission color described herein corresponds to one example of the light emitting form of the light emitter 5, and the first emission color corresponds to a first light emitting form. Note that the light emitting form includes other forms than the emission color. For example, the light emitting form includes the movement speed of the light emitting spot 9, the emission intensity of the light emitting spot 9, the presence or absence of blinking of the light emitting spot 9, and the blinking speed of the light emitting spot 9.

In the case of notifying that the approaching object is approaching the vehicle V, the control device 2 identifies the position (precisely, the position of the approaching object relative to the vehicle V) of the approaching object based on an output signal from the sensor, and identifies the distance between the vehicle V and the approaching object and the approaching speed of the approaching object. Thereafter, the control device 2 determined whether or not the identified distance and the identified approaching speed each exceed thresholds. The threshold described herein is a value (a reference value) referred when the degree of approaching of the approaching object is determined, and is set in advance for each of the distance and the approaching speed. That is, when the identified distance and the identified approaching speed each exceed the thresholds, it means that the approaching object is rapidly approaching the vehicle V.

In a case where the control device 2 determines that at least one of the identified distance and the identified approaching speed exceeds the threshold, the control device 2 controls the light emitter 5 such that light is emitted in the pattern (hereinafter referred to as a "second light emitting pattern") illustrated in FIG. 14. At this point, the control device 2 causes only one, which corresponds to the identified result (i.e., the position of the approaching object relative to the vehicle V) of the position of the approaching object, of the pair of right and left light emitters 5 to emit light. That is, in a case where the approaching object is positioned on the right side of the vehicle V, the control device 2 causes only the right light emitter 5A to emit light. Conversely, in a case where the approaching object is positioned on the left side of the vehicle V, the control device 2 causes only the left light emitter 5B to emit light.

The second light emitting pattern will be described in detail. The control device 2 controls the light emitter 5 such that all of the lights forming the light emitter 5 corresponding to the position of the approaching object are simultaneously turned on and are simultaneously turned off. Accordingly, the entire area of the light emitter 5 serves as the light emitting spot 9, and the light emitting spot 9 blinks.

Note that when the light emitter 5 corresponding to the position of the approaching object emits light in the second light emitting pattern, the control device 2 controls the light emitter 5 such that the emission color of the light emitting spot 9 is a second emission color (in the present embodiment, the color of red). The second emission color described herein corresponds to a second light emitting form, and is different from the first emission color corresponding to the first light emitting form. Note that the first emission color and the second emission color as described above are not specifically limited, and can be set to optional colors.

Moreover, in the second embodiment, the blinking speed when the light emitting spot 9 blinks is a constant speed, but the present invention is not limited to above. The blinking speed may be variable, and may be changed according to the degree of approaching of the approaching object. For example, the blinking speed may increase as the approaching object approaches.

Figure 15:
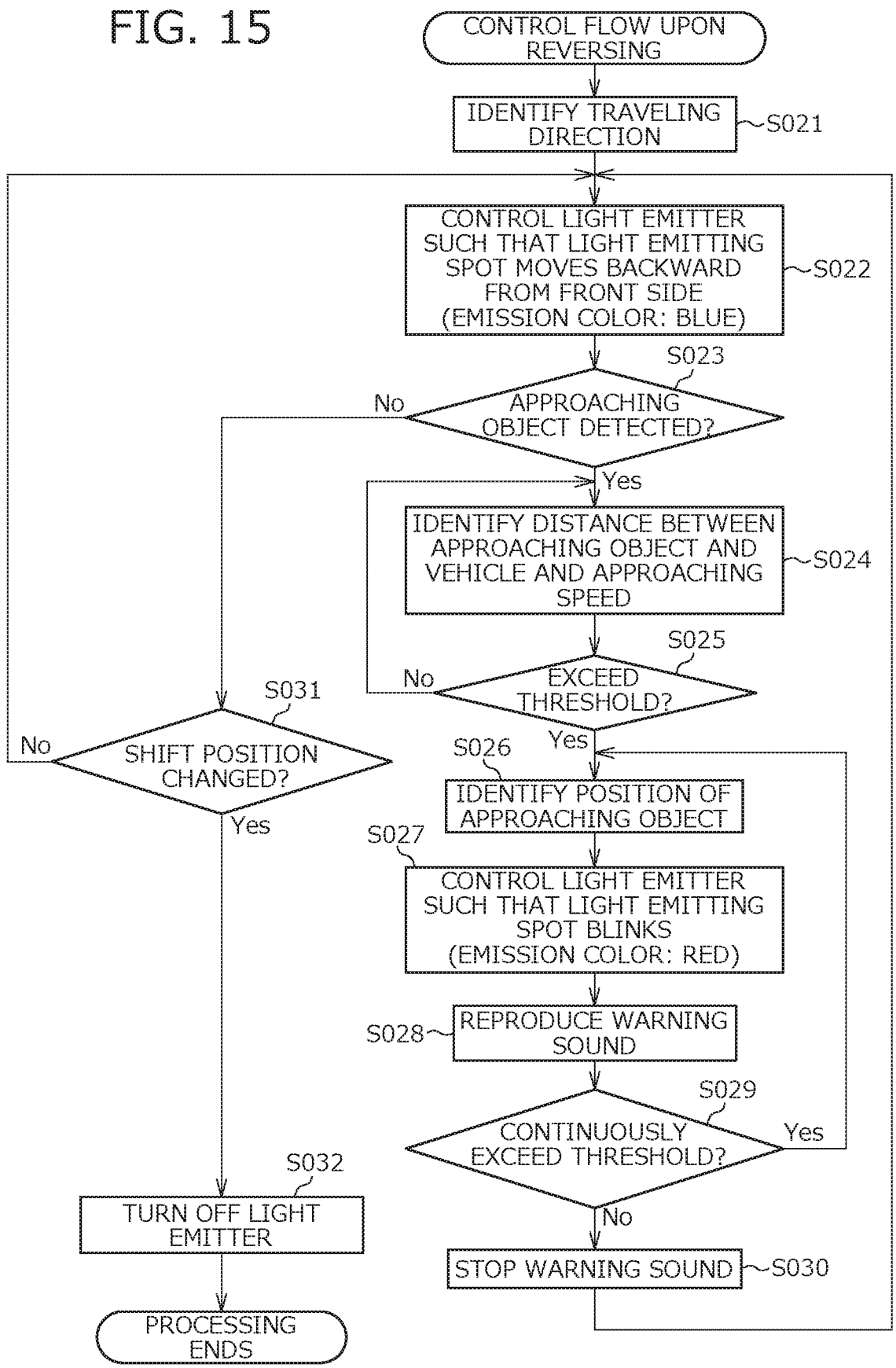
FIG. 15 is a flowchart of a control flow upon reversing.

Next, the flow (the control flow) of control of the light emitter 5 by the control device 2 in the second embodiment will be described. In the second embodiment, the control device 2 controls the light emitter 5 according to a flow illustrated in FIG. 15 when the vehicle V is reversing for parking etc. FIG. 15 is a flowchart of the control flow upon reversing. Hereinafter, the control flow upon reversing will be described with reference to FIG. 15.

When the control flow upon reversing begins, the shift lever 17 is operated such that the shift position is brought into "R," and the signal indicating the shift position after lever operation is output to the control device 2. When identifying, in response to the output signal, that the shift position is "R," the control device 2 takes such identification as a trigger to start the control flow upon reversing.

In the control flow upon reversing, the control device 2 first identifies the traveling direction of the vehicle V based on a current shift position (S021). At this point, since the shift position is set to "R," the control device 2 identifies, at the step S021, the traveling direction of the vehicle V traveling backward.

Thereafter, the control device 2 controls the right light emitter 5A such that the light emitter 5A emits light in the first light emitting pattern for notifying the occupant (precisely, the driver) of the identified traveling direction of the vehicle V. That is, the control device 2 controls the right light emitter 5A such that the light emitting spot 9 moves backward from the front side in the front-to-rear direction (S022). Note that at this point, the control device 2 controls the right light emitter 5A such that the emission color of the light emitting spot 9 is the first emission color (specifically, the color of blue).

Moreover, based on the presence or absence of the output signal received from each sensor (i.e., a right front sensor 3a, a right rear sensor 3b, a left front sensor 3c, and a left rear sensor 3d), the control device 2 determines whether or not each sensor has detected the approaching object (S023). Then, when it is determined that there is a detected approaching object, the control device 2 identifies, based on information indicated by the signal received from the sensor, the distance between the vehicle V and the approaching object and the approaching speed of the approaching object (S024). Thereafter, the control device 2 determines whether or not each of the identified results of the distance and the approaching speed exceeds the threshold (S025).

Then, when determining that each of the identified results of the distance and the approaching speed does not exceed the threshold, the control device 2 controls the right light emitter 5A such that the light emitter 5A continuously emits light in the first light emitting pattern. On the other hand, when determining that the identified result of at least one item of the distance and the approaching speed exceeds the threshold, the control device 2 identifies the position (the position relative to the vehicle V) of the approaching object (S026). In addition, the control device controls the light emitter 5 such that one, which corresponds to the position of the approaching object, of the pair of right and left light emitters 5 emits light in the second light emitting pattern. That is, the control device 2 controls the light emitter 5 corresponding to the position of the approaching object such that the light emitting spot 9 blinks (S027). Note that at this point, the control device 2 controls the light emitter 5 corresponding to the position of the approaching object such that the emission color of the light emitting spot 9 is the second emission color (specifically, the color of red).

The control device 2 reproduces warning sound via the buzzer 4 while the light emitter 5 corresponding to the position of the approaching object is emitting light in the second light emitting pattern (S028). The warning sound described herein is sound for notifying the occupant (the driver) of the vehicle V of light emission from the light emitter 5. Note that sound to be employed as the warning sound is preferably different from normal chime sound (i.e., notification sound for notifying a reversing state) emitted upon reversing.

Thereafter, as long as a state in which the distance between the vehicle V and the approaching object or the approaching speed of the approaching object exceeds the threshold is continued (Yes at S029), the light emitter 5 corresponding to the position of the approaching object continuously emits light in the second light emission pattern, and the warning sound is continuously emitted from the buzzer 4.

On the other hand, in a case where it is determined that both of the distance and the approaching speed fall below the thresholds (No at S029), the control device 2 controls the buzzer 4 to stop the warning sound (S030). Moreover, after having stopped light emitting operation performed so far in the second light emitting pattern, the control device 2 controls the right light emitter 5A to emit light in the first light emitting pattern.

Of a series of steps described above, the steps S024 to S030 are repeatedly performed while it is, at the step S023, determined that there is a detected approaching object. On the other hand, when it is, at the step S023, determined that there is no detected approaching object, the control device 2 determines, based on the presence or absence of the output signal received from the shift lever 17, whether or not the shift position has been changed (clearly, whether or not the shift position has been changed to other positions than "R") (S031). Then, in a case where it is determined that the shift position has been changed to other positions than "R," the control device 2 turns off the light emitter (S032). When the step S032 ends, the control flow upon reversing ends at this point.

As described above, in the control flow upon reversing, while the vehicle V is reversing, the right light emitter 5A emits light such that the light emitting spot 9 moves backward from the front side in the front-to-rear direction. Accordingly, the occupant (precisely, the driver) of the vehicle V visually recognizes movement (the flow) of the light emitting spot 9 to recognize the traveling direction of the vehicle V (i.e., recognize that the vehicle V is reversing).

Moreover, in the control flow upon reversing as described above, the light emitting pattern (specifically, the range, motion, and emission color of the light emitting spot 9) of the light emitter 5 is changed according to the identified result of at least one item of the distance between the vehicle V and the approaching object and the approaching speed of the approaching object. Accordingly, the occupant grasps the degree of approaching of the approaching object based on a change in the light emitting pattern.

Note that in the second embodiment, when the vehicle V is reversing, the light emitter 5 is controlled such that the light emitting spot 9 of the light emitter 5 moves backward from the front side in the front-to-rear direction to notify the traveling direction of the vehicle V. Note that the present invention is not limited to above, and the light emitter 5 may be, when the vehicle V is traveling forward, controlled such that the light emitting spot 9 of the light emitter 5 moves forward from the rear side in the front-to-rear direction to notify the traveling direction of the vehicle V.

Moreover, in the second embodiment, the light emitter 5 emitting light in the first light emitting pattern to notify the traveling direction of the vehicle V is the right light emitter 5A of the pair of right and left light emitters 5. Note that the present invention is not limited to above, and the light emitter 5 targeted for light emission may be set as necessary according to the location of the occupant (specifically, the location of a driver seat).

Third Embodiment

In the above-described embodiments, light emission from the light emitter 5 and the warning sound from the buzzer 4 are used as the technique of notifying, e.g., approaching of the approaching object. According to the third embodiment, when the status of a conveyance is notified to an occupant, light and vibration are used instead of the warning sound. In this case, such notification is not notification via sound, and therefore, the status of the conveyance can be notified without interfering with listening to radio etc. in the conveyance. Further, notification via light and vibration can be performed only for a particular person.

In the third embodiment, a vehicle lighting device includes a vehicle notification device (corresponding to a conveyance notification unit). Note that the vehicle notification device in the third embodiment is also applicable to other conveyances than a vehicle, and is also applicable to a motorcycle, a motor tricycle, a ship, and an air plane, for example.

Use of the vehicle notification device (hereinafter referred to as a "vehicle notification device 1L") according to the third embodiment will be outlined. The vehicle notification device 1L is mounted on a vehicle V. The vehicle notification device 1L emits light in a vehicle compartment and generates vibration of a seat S to notify a driver of the presence of an approaching object for alerting. More specifically, when the driver of the vehicle V changes lane while the vehicle V is moving (traveling) forward, the vehicle notification device 1L notifies, via light emission and vibration, the driver of the presence of an approaching subsequent vehicle as the approaching object on the changed lane.

Figure 16:
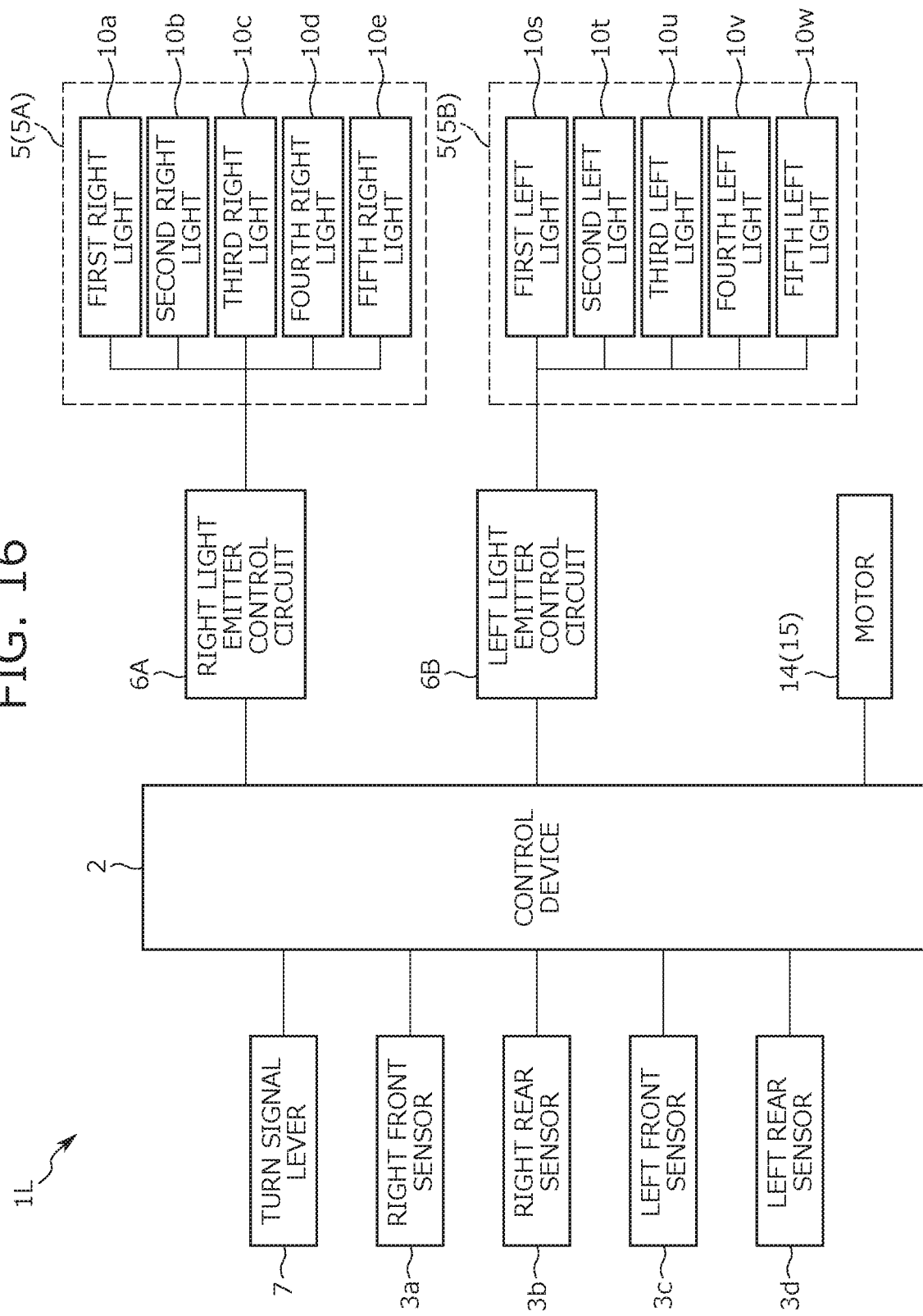
FIG. 16 is a block diagram of a configuration of a conveyance notification unit according to a third embodiment.

An equipment configuration of the vehicle notification device 1L will be described with reference to FIG. 16. FIG. 16 is a block diagram of the equipment configuration of the vehicle notification device 1L. As illustrated in FIG. 16, the vehicle notification device 1L has a control device 2, sensors, motors 14, light emitters 5, control circuits, and a turn signal lever 7.

Figure 17:
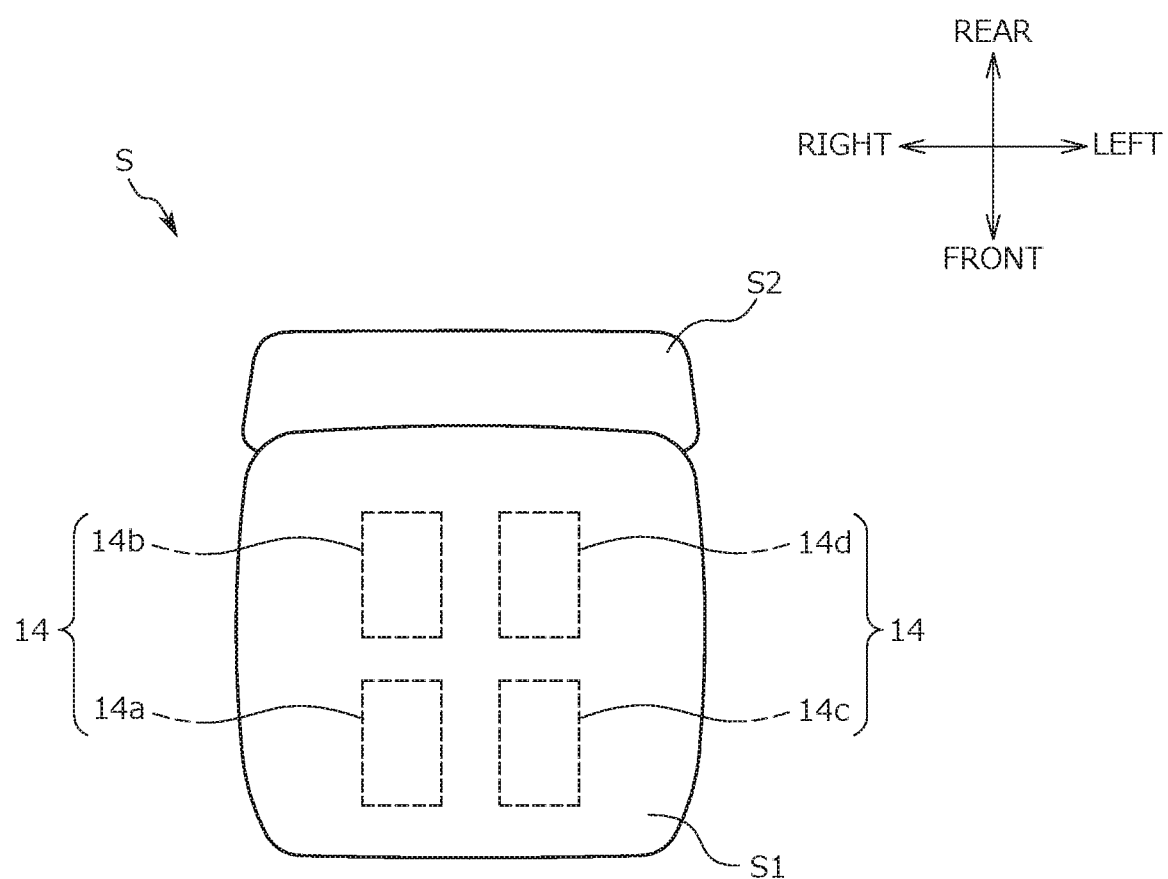
FIG. 17 is a view for describing arrangement of motors, and is a schematic plan view of a seat.

In the third embodiment, the control device 2 is configured to control the motors 14 and the light emitters 5. The motor 14 corresponds to a vibrator, and is configured to rotate to vibrate the seat S. The motor 14 is a so-called "vibration motor" including an unbalance mass motor. More specifically, the motors 14 include, as illustrated in FIG. 17, a right front motor 14a, a right rear motor 14b, a left front motor 14c, and a left rear motor 14d arranged on the front, rear, right, and left sides at a seat cushion S1 of the seat S. The configuration in which the motors 14 are provided on the front and rear sides in the vehicle V is preferable because the front and rear sides of the seat cushion S1 are constantly-contact portions and the motors 14 are easily arranged. Meanwhile, the motors 14 may be provided on the front and rear sides of a not-shown arm rest, for example.

In the third embodiment, the control device 2 controls, as in the first embodiment, the light emitter 5 such that the light emitter 5 targeted for light emission emits light in the light emitting pattern illustrated in FIG. 6. Specifically, the control device 2 controls the light emitter 5 such that a light emitting spot 9 of the light emitter 5 targeted for light emission moves along a direction corresponding to the movement direction (the approaching direction) of the approaching object detected by the sensor. Accordingly, the light emitting spot 9 moves forward from the rear side, and returns to a rear end of the light emitter 5 after having reached a front end of the light emitter 5. The light emitting spot 9 repeats such movement (forward movement from the rear side).

Note that upon light emission from the light emitter 5 in the above-described light emitting pattern, the control device 2 recognizes via a signal received from the sensor that the approaching object is approaching the vehicle V, and identifies a distance between the vehicle V and the approaching object. Then, the control device 2 controls the light emitter 5 such that the light emitting spot 9 moves at a movement speed corresponding to the identified result of the distance between the vehicle V and the approaching object. Moreover, the control device 2 determines whether or not the identified result of the distance exceeds a threshold, and in a case where the identified result of the distance falls below the threshold, controls the light emitter 5 such that the emission color of the light emitting spot 9 is a first emission color (e.g., the color of blue). On the other hand, in a case where the identified result of the distance exceeds the threshold, the control device 2 controls the light emitter 5 such that the emission color of the light emitting spot 9 is a second emission color (e.g., the color of red).

Note that in the third embodiment, the distance between the vehicle V and the approaching object is identified, and the emission color and movement speed of the light emitting spot 9 are set according to such an identified result. However, the present invention is not limited to above. The approaching speed of the approaching object may be identified, and the emission color and movement speed of the light emitting spot 9 may be set according to such an identified result.

Each light emitter 5 can emit light such that the light emitting spot 9 moves while blinking. The control device 2 controls the light emitter 5 such that the light emitting spot 9 moves while blinking at a blinking speed corresponding to the distance between the vehicle V and the approaching object and the approaching speed of the approaching object.

Figure 18A:
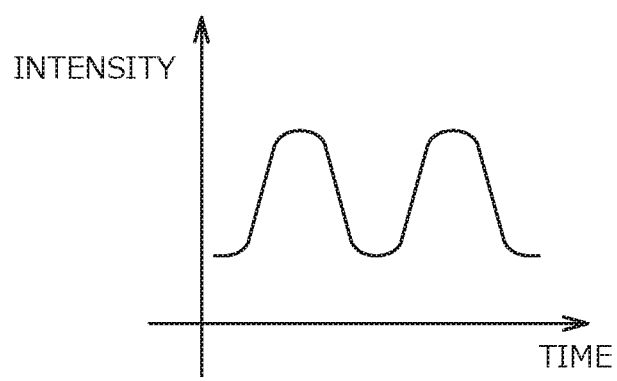
FIG. 18A is a graph of a form in which relatively-weak vibration is provided at a relatively-long interval.
Figure 18B:
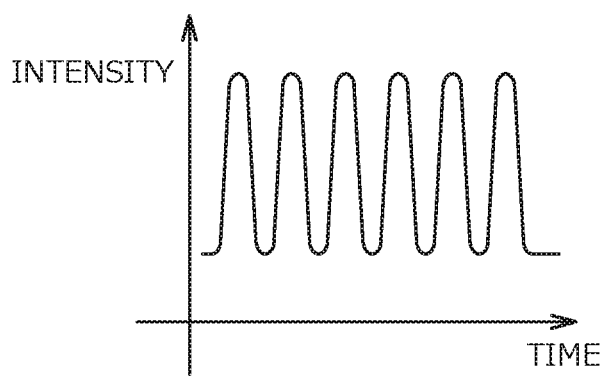
FIG. 18B is a graph of a form in which relatively-strong vibration is provided at a relatively-short interval.

The motor 14 is configured to vibrate to notify the occupant of the presence of the approaching object as described above. The right front motor 14a, the right rear motor 14b, the left front motor 14c, and the left rear motor 14d included in the motors 14 operate such that a vibration spot moves in a predetermined direction (specifically, the vibration spot moves back and forth and right to left at a predetermined interval). Hereinafter, the vibration form of the motor 14 will be described with reference to FIGS. 17, 18A, and 18B. FIG. 18A is a graph of a form in which relatively-weak vibration is provided at a relatively-long vibration interval, and FIG. 18B is a graph of a form in which relatively-strong vibration is provided at a relatively-short vibration interval.

The control device 2 vibrates only ones, which correspond to the position of the approaching object, of the right front motor 14a, the right rear motor 14b, the left front motor 14c, and the left rear motor 14d included in the motors 14. That is, in a case where the approaching object is positioned on the right side of the vehicle V, the control device 2 vibrates only the right front motor 14a and the right rear motor 14b on the right side. Conversely, in a case where the approaching object is positioned on the left side of the vehicle V, the control device 2 vibrates only the left front motor 14c and the left rear motor 14d on the left side.

Moreover, the control device 2 controls the motors 14 such that the vibration spot of the motor 14 targeted for vibration moves along the direction corresponding to the movement direction (the approaching direction) of the approaching object detected by the sensor. Further, according to the approaching distance and approaching speed of the approaching object, the control device 2 controls the motors 14 targeted for vibration such that the motors 14 targeted for vibration vibrate in the vibration form illustrated in FIG. 18A or 18B by way of example.

A vibration pattern of the motor 14 will be described. For example, after the right rear motor 14b has vibrated, the control device 2 vibrates the right front motor 14a in the front of the right rear motor 14b. The control device 2 controls the motors 14 such that vibration is sequentially switched among the motors 14. Accordingly, the vibration spot of the motor 14 moves forward from the rear side. In this case, the interval of vibration of the right front motor 14a after vibration of the right rear motor 14b is set shorter than the interval of subsequent repeated vibration of the right rear motor 14b after vibration of the right front motor 14a. The motor 14 vibrates at such an interval so that a seated person can sense a vibration direction even in a configuration in which only two motors 14 are provided in the front-to-rear direction.

When the motor 14 is vibrated in the above-described vibration pattern, the control device 2 sets the interval and intensity of vibration. Further, the control device 2 controls the motors 14 such that the vibration spot moves at a set movement speed. Specifically, the control device 2 controls the motors 14 such that the vibration spot moves at the movement speed corresponding to the distance between the vehicle V and the approaching object. More specifically, the control device 2 controls the motors 14 such that the vibration spot moves faster as the distance decreases and moves slower as the distance increases.

Moreover, the control device 2 controls the motors 14 to the vibration form corresponding to the identified result of the distance between the vehicle V and the approaching object. Specifically, the control device 2 determines whether or not the identified result of the distance exceeds the threshold. In a case where the identified result of the distance falls below the threshold, the control device 2 controls the motors 14 such that the vibration interval of each of the right front motor 14a, the right rear motor 14b, the left front motor 14c, and the left rear motor 14d is relatively long as illustrated in FIG. 18A. On the other hand, in a case where the identified result of the distance exceeds the threshold, the control device 2 controls the motors 14 such that the vibration interval of each motor is relatively short as illustrated in FIG. 18B.

Note that in the third embodiment, the interval and intensity of vibration are set according to the distance between the vehicle V and the approaching object, and the movement speed of the vibration spot is further set. However, the present invention is not limited to above. The interval and intensity of vibration may be set according to the approaching speed of the approaching object, and the movement speed of the vibration spot may be further set. In this case, the motors 14 are controlled such that the vibration spot moves faster as the approaching speed increases and moves slower as the approaching speed decreases.

When the interval and intensity of vibration are changed according to the approaching speed of the approaching object, if the approaching speed falls below a threshold, the vibration interval may be increased, or the vibration intensity may be weakened. Conversely, if the approaching speed exceeds the threshold, the vibration interval may be decreased, or the vibration intensity may be strengthened.

Alternatively, both of the distance between the vehicle V and the approaching object and the approaching speed of the approaching object may be identified, and the interval and intensity of vibration and the movement speed of the vibration spot may be set according to both of these identified results.

Figure 19:
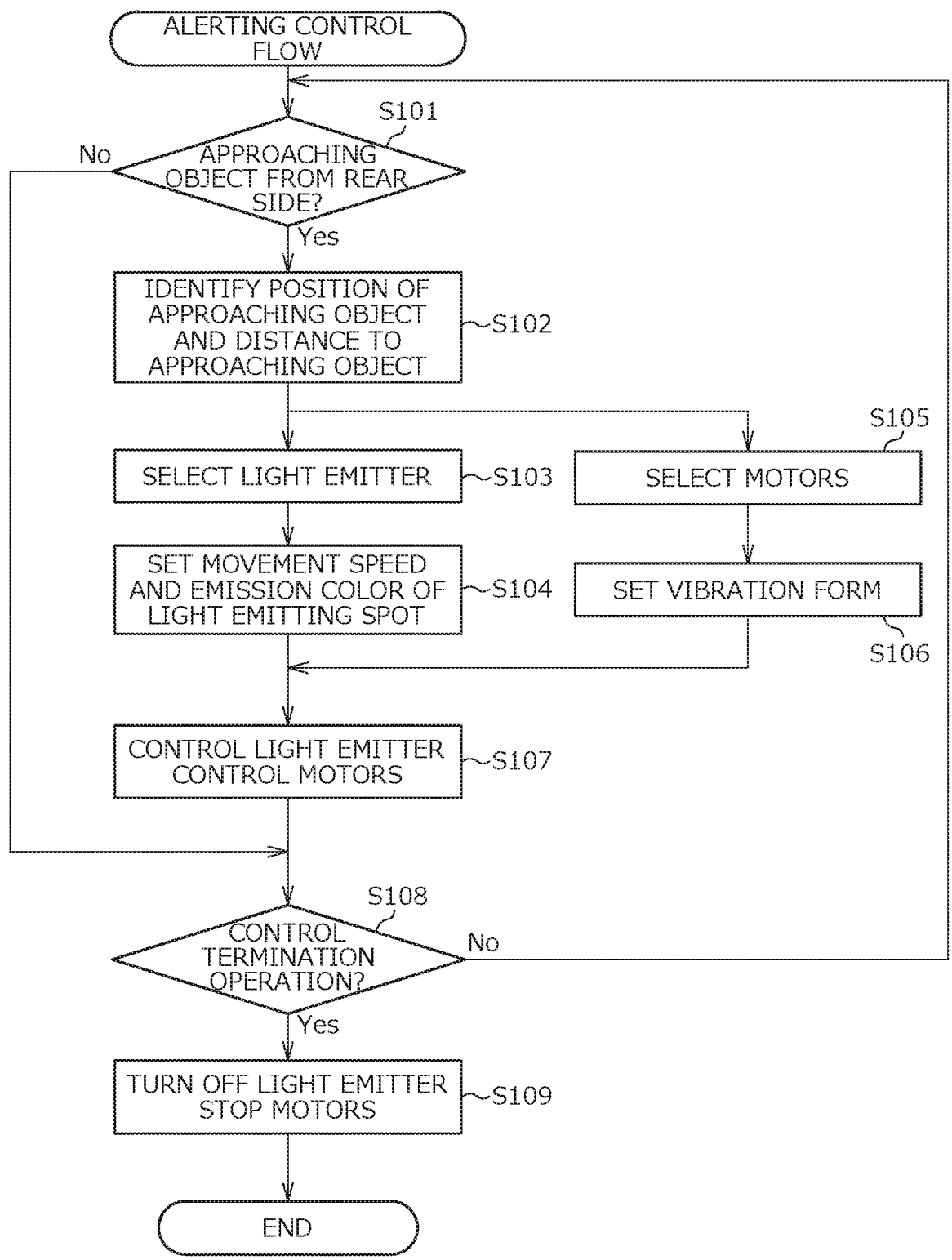
FIG. 19 is a flowchart of an alerting control flow in the third embodiment.

Next, the flow of control of the light emitter 5 and the motors 14 in the third embodiment will be described. In the third embodiment, when the occupant of the vehicle V operates the turn signal lever 7 to change lane, the control device 2 takes such operation as a trigger, thereby performing an alerting control flow illustrated in FIG. 19 to control the light emitter 5 and the motors 14. FIG. 19 is a flowchart of the alerting control flow in the third embodiment. Hereinafter, the alerting control flow in the third embodiment will be described with reference to FIG. 19.

During the alerting control flow in the third embodiment, steps for control of the light emitter 5 are common to those in the alerting control flow in the first embodiment, as seen from FIGS. 7 and 19. Specifically, first in the alerting control flow in the third embodiment, the control device 2 determines, via the presence or absence of the output signal received from the sensor positioned on the same side as a lane change direction, whether or not the approaching subsequent vehicle is present on the changed lane (S101). At this point, the processing transitions to a step S102 in a case where it is determined that the approaching subsequent vehicle is present, and transitions to a step S108 in a case where it is determined that the approaching subsequent vehicle is not present.

At the step S102, the control device 2 identifies the position of the approaching subsequent vehicle and the distance between the vehicle V and the approaching subsequent vehicle based on the output signal from the sensor. Thereafter, the control device 2 selects the light emitter 5 corresponding to the identified result of the position of the approaching subsequent vehicle from the pair of right and left light emitters 5 (S103). Moreover, according to the distance identified at the step S102, the control device 2 sets the movement speed and emission color of the light emitting spot 9 upon light emission from the light emitter 5 (S104).

After the step S102, the control device 2 selects the motors 14 corresponding to the identified result of the position of the approaching subsequent vehicle from the motors 14 provided two by two on the right and left sides (S105). The motors 14 selected at the step S105 are targeted for driving (i.e., targeted for control by the control device 2) in subsequent vibration providing operation.

According to the distance identified at the step S102, the control device 2 sets the movement speed, vibration interval, and vibration intensity (the vibration form) of the vibration spot upon vibration of the motors 14 (S106). Specifically, the movement speed, vibration interval, and vibration intensity of the vibration spot are set in such a manner that the distance as a parameter is substituted into a predetermined calculation formula. At this point, it is set such that the movement speed of the vibration spot increases, the vibration interval decreases, and the vibration intensity increases as the distance decreases. Note that in the third embodiment, the movement speed, vibration interval, and vibration intensity of the vibration spot are set according to the distance, but any one of these items may be set according to the distance.

Thereafter, the control device 2 controls the light emitter 5 and the motors 14 targeted for control (S107). At this point, the light emitter 5 is controlled such that the light emitting spot 9 moves along the direction corresponding to the movement direction (the approaching direction) of the approaching object, and the motors 14 are controlled such that the seat cushion S1 vibrates along the direction corresponding to the movement direction (the approaching direction) of the approaching object.

More specifically, the control device 2 controls the light emitter 5 targeted for control such that the light emitting spot 9 emits light in the emission color set at the step S104 and moves forward from the rear side at the movement speed set at the step S104. At the same time, the control device 2 controls the motors such that vibration is generated forward from the rear side in the vibration form set at the step S106 (i.e., the vibration spot moves from the right rear motor 14b to the right front motor 14a or from the left rear motor 14d to the left front motor 14c).

Note that when the light emitter 5 is controlled at the step S107, the light emitter 5 may be controlled such that the light emitting spot 9 moves while blinking. At this point, when the light emitter 5 is controlled such that the light emitting spot 9 moves while blinking at the blinking speed corresponding to the distance (the distance between the vehicle V and the approaching subsequent vehicle) identified at the step S102, the driver of the vehicle V easily grasps the status (specifically, the degree of approaching) of the approaching subsequent vehicle.

Thereafter, until the operation of returning the turn signal lever 7 to an original position (a normal position) is performed as control termination operation, the control device 2 repeats a series of steps S101 to S107 as described above (S108). Then, once the control termination operation is performed and the control device 2 recognizes that such operation has been received, the control device 2 turns off the light emitter 5, and stops the motors 14 (S109). When the step S109 ends, the alerting control flow ends at this point. Note that in a case where the control termination operation is performed before detection of the approaching subsequent vehicle (i.e., No at the step S101, and Yes at the step S108), the alerting control flow ends without performing the step S109.

As described above, in the alerting control flow, when the occupant of the vehicle V changes lane, if the approaching subsequent vehicle on the changed lane is detected by the sensor, the control device 2 causes the light emitter 5 (i.e., the light emitter 5 positioned on the same side as the approaching subsequent vehicle as viewed from the vehicle V) positioned on the same side as the lane change direction to emit light, and causes the motors 14 positioned on the same side as the lane change direction to vibrate. At this point, the light emitter 5 targeted for light emission emits light such that the light emitting spot 9 moves forward from the rear side in the front-to-rear direction. Accordingly, the driver of the vehicle V visually recognizes movement (the flow) of the light emitting spot 9 to recognize the presence of the approaching subsequent vehicle on the changed lane, i.e., the approaching direction of the object approaching the vehicle V on the changed lane.

Moreover, the motors 14 vibrate in an order from the right rear motor 14b or the left rear motor 14d on the rear side to the right front motor 14a or the left front motor 14c on the front side. Accordingly, even when the driver of the vehicle V misses light emission from the light emitter 5, the driver senses the order of vibration by a sense of touch to recognize the presence of the approaching subsequent vehicle on the changed lane.

Further, the light emitting spot 9 and the vibration spot move forward from the rear side, and therefore, the driver of the vehicle V intuitively grasps the presence of the approaching subsequent vehicle. In addition, the light emitting form (specifically, the movement speed and emission color of the light emitting spot 9) of the light emitter 5 and the vibration form (specifically, the vibration interval and vibration intensity of the motor 14) of the motor 14 change according to the identified result of the distance between the vehicle V and the approaching object. Accordingly, the driver grasps the degree of approaching of the approaching object from a change in the light emitting form and the vibration form.

Moreover, in the third embodiment, only one, which is positioned on the same side as the changed lane, of the pair of right and left light emitters 5 emits light, and only ones, which are positioned on the same side as the changed lane, of the right and left pairs of motors 14 (i.e., the right front motor 14a and the right rear motor 14b or the left front motor 14c or the left rear motor 14d) vibrate. Thus, the driver accurately grasps which one of the right and left sides the approaching subsequent vehicle is positioned.

For the above-described vehicle notification device, variations are conceivable. Hereinafter, four variations (first to fourth variations) will be described as the variations of the vehicle notification device according to the third embodiment. Note that in each variation described below, the vehicle notification device will be described as an example of the conveyance notification unit as in the above-described embodiment. Moreover, in each variation, differences from the above-described embodiment will be mainly described, and description of points common to the above-described embodiment will be omitted.

(1) First Variation

Figure 20:
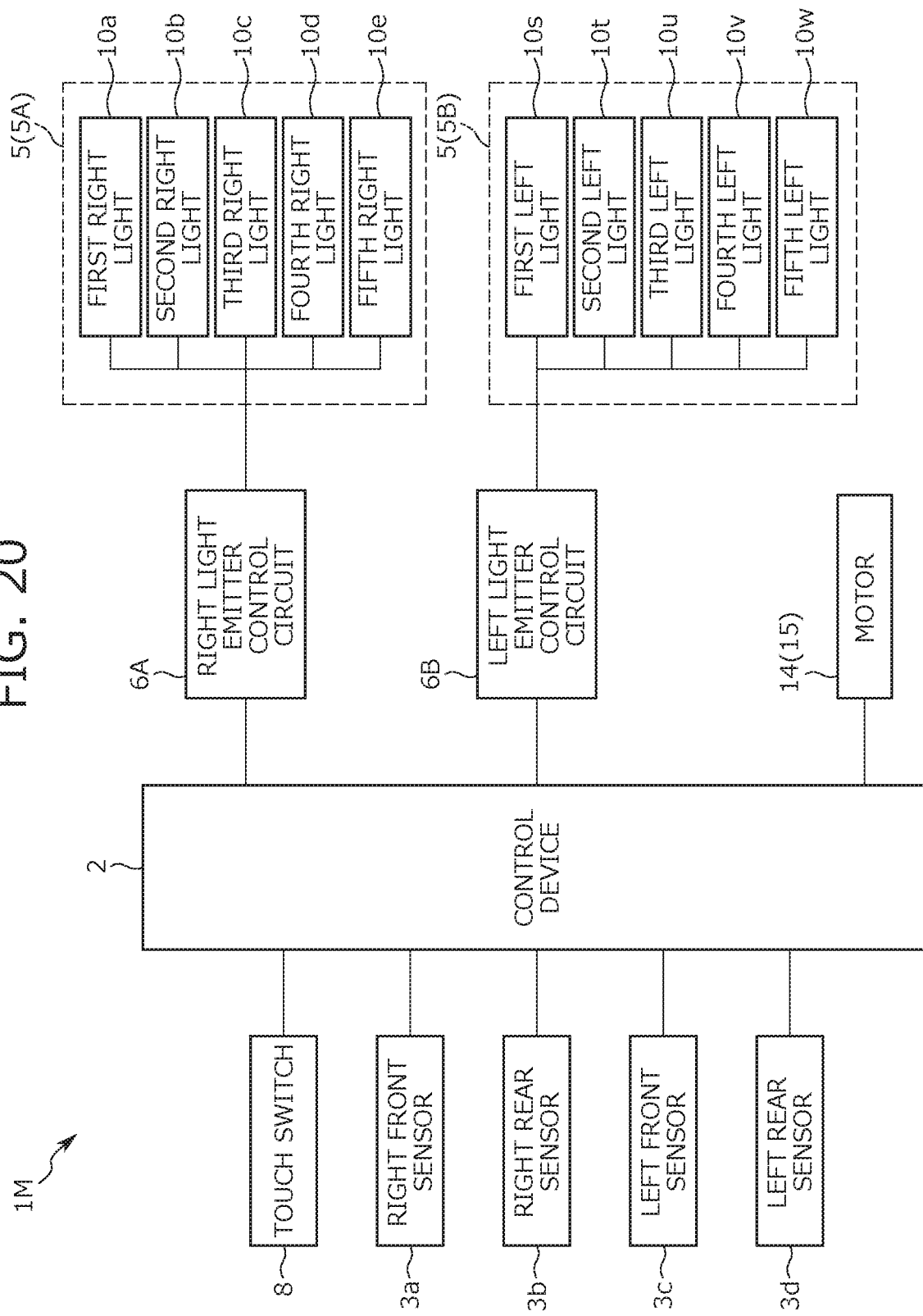
FIG. 20 is a block diagram of a configuration of a conveyance notification unit according to a first variation of the third embodiment.

A vehicle notification device 1M according to the first variation is configured to notify the occupant of the presence of the approaching subsequent vehicle on a door D side by light emission from the light emitter 5 and vibration by the motors 14 if the approaching subsequent vehicle is present on the door D side when the vehicle V is in a stop state and the occupant in the vehicle V opens a door D. A configuration of the vehicle notification device 1M according to the first variation will be described with reference to FIG. 20. Such a configuration is common to the configuration of the vehicle notification device 1L illustrated in FIG. 16, except that a touch switch 8 is provided instead of the turn signal lever 7. FIG. 20 is a block diagram of the configuration of the vehicle notification device 1M according to the first variation of the third embodiment.

The touch switch 8 is similar to that provided at the vehicle lighting device 1x according to the first variation of the first embodiment, and is configured to output a signal to the control device 2 when the occupant touches a door knob. When receiving the output signal from the touch switch 8, the control device 2 identifies the door D targeted for opening based on the signal. Then, when receiving the output signal from the sensor on the same side as the door D targeted for opening, the control device 2 recognizes that the approaching subsequent vehicle is present on the door D side.

When recognizing that the approaching subsequent vehicle is present on the side of the door D targeted for opening, the control device 2 identifies the position of the approaching subsequent vehicle. In addition, the control device 2 controls one, which corresponds to the identified position of the approaching subsequent vehicle, of the pair of right and left light emitters 5 to emit light. Moreover, the control device 2 controls only ones (specifically, the right front motor 14a and the right rear motor 14b on the right side or the left front motor 14c and the left rear motor 14d on the left side), which correspond to the identified position of the approaching subsequent vehicle, of the motors 14 provided on the right and left sides to vibrate.

As described above, in the first variation of the third embodiment, when the approaching subsequent vehicle is present on the side of the door D targeted for opening, the control device 2 executes the alerting control flow, thereby causing the light emitter 5 to emit light and causing the motors 14 to vibrate. Note that when the occupant touches the door knob of the door D targeted for opening to operate the touch switch 8, such operation is taken as a trigger to start the alerting control flow according to the first variation, and such an alerting control flow is performed by steps similar to those of the alerting control flow illustrated in FIG. 19. Note that in the alerting control flow of the first variation, operation in which the occupant releases the hand from the door knob corresponds to the control termination operation, and the alerting control flow ends when the occupant releases the hand from the door knob to turn off the touch switch 8.

Moreover, during the alerting control flow according to the first variation, at the step (the step corresponding to the step S107 in FIG. 19) of causing the light emitter 5 to emit light and causing the motors 14 to vibrate, the light emitter 5 and the motors 14 (precisely, the light emitter 5 and the motors 14 arranged on the same side as the approaching subsequent vehicle) are controlled such that the light emitting spot 9 of the light emitter 5 and the vibration spot of the motor 14 moves forward from the rear side. Accordingly, the driver of the vehicle V visually recognizes movement (the flow) of the light emitting spot 9 or senses movement of the vibration spot, thereby intuitively grasping that the approaching subsequent vehicle is approaching the door D targeted for opening.

(2) Second Variation

According to a vehicle notification device according to the second variation, while the vehicle V is traveling in an urban area during night or raining, if a bicycle (precisely, a light-off bicycle hereinafter referred to as an "approaching bicycle") is approaching the vehicle V from the front, the approaching bicycle is detected by the sensor, and the presence of the approaching bicycle can be notified to the occupant by light emission from the light emitter 5 and vibration of the motors 14.

Note that a configuration of the vehicle notification device according to the second variation is substantially common to the configuration of the vehicle notification device 1L illustrated in FIG. 16.

In the second variation, when the right front sensor 3a or the left front sensor 3c detects the approaching bicycle, the control device 2 identifies the position of the approaching bicycle, and controls one, which corresponds to the identified position of the approaching bicycle, of the pair of right and left light emitters 5 to emit light. At the same time, the control device 2 controls ones, which correspond to the identified position of the approaching bicycle, of the motors 14 provided on the right and left sides to vibrate. That is, in the second variation, when the approaching bicycle is present, the control device 2 executes the alerting control flow, thereby causing the light emitter 5 to emit light and causing the motors 14 to vibrate.

Figure 21:
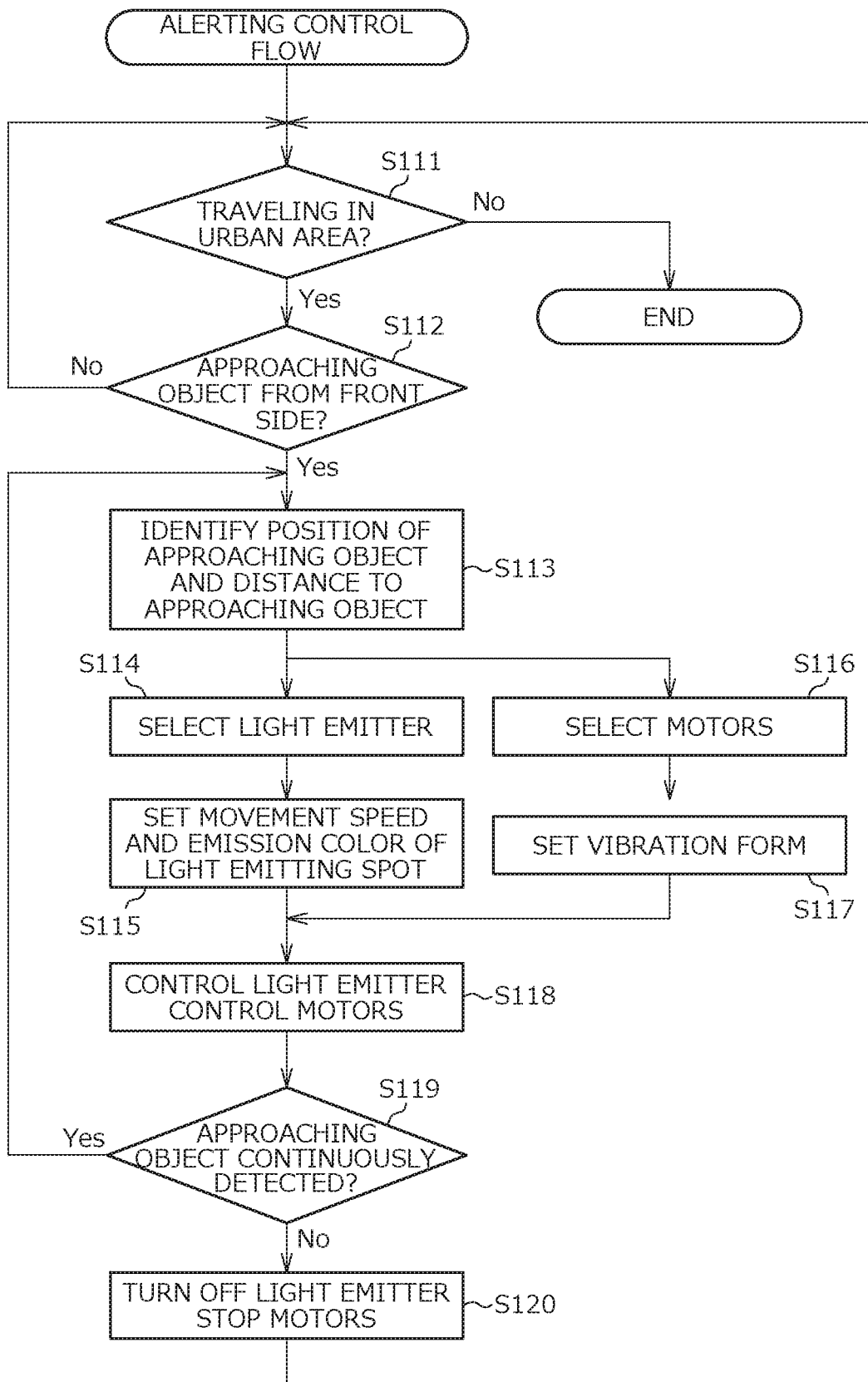
FIG. 21 is a flowchart of an alerting control flow in a second variation of the third embodiment.

Hereinafter, the alerting control flow according to the second variation will be described with reference to FIG. 21. FIG. 21 is a flowchart of the alerting control flow according to the second variation of the third embodiment. When the vehicle V enters the urban area, the control device 2 takes such entrance as a trigger to execute the alerting control flow illustrated in FIG. 21, thereby controlling the light emitter 5 and the motors 14. Note that entrance of the vehicle V into the urban area is sensed via the function of a not-shown car navigation system or GPS mounted on the vehicle V.

During the alerting control flow according to the second variation of the third embodiment, a series of steps from the step of identifying the current position of the vehicle to the step of identifying, e.g., the position of the approaching bicycle, i.e., steps S111 to S113, are common to those in the alerting control flow according to the second variation of the first embodiment, as seen from FIGS. 9 and 21. Note that at the step S113, the control device 2 identifies, based on the output signal from the sensor, the position of the approaching bicycle and the distance between the vehicle V and the approaching bicycle.

Thereafter, the control device 2 selects one corresponding to the identified result of the position of the approaching bicycle from the pair of right and left light emitters 5 (S114). The light emitter 5 selected at the step S114 is targeted for control by the control device 2, and emits light in subsequent light emission operation. Moreover, the control device 2 sets the movement speed and emission color of the light emitting spot 9 upon light emission from the light emitter 5 according to the distance identified at the step S113 (S115). The step S115 is performed in a manner similar to that of the step S004 of the alerting control flow of the first embodiment illustrated in FIG. 7. That is, the movement speed of the light emitting spot 9 is set higher as the distance decreases, and is set lower as the distance increases. Moreover, the emission color of the light emitting spot 9 is set to the first emission color (the color of blue) in a case where the distance falls below the threshold, and is set to the second emission color (the color of red) in a case where the distance exceeds the threshold.

After the step S113, the control device 2 selects ones corresponding to the identified result of the position of the approaching bicycle from the motors 14 provided on the right and left sides (S116). The motors 14 selected at the step S116 are targeted for control by the control device 2, and are driven in subsequent vibration providing operation. Moreover, the control device 2 sets the movement speed, vibration interval, and vibration intensity (i.e., the vibration form) of the vibration spot upon vibration of the motor 14 according to the distance identified at the step S113 (S117). The step S117 is performed in a manner similar to that of the step S106 of the alerting control flow of the third embodiment illustrated in FIG. 19. That is, as the distance decreases, the movement speed of the vibration spot is set higher, the vibration interval is set shorter, and the vibration intensity is set higher.

Thereafter, the control device 2 controls the light emitter 5 and the motors 14 targeted for control (S118). Specifically, the control device 2 controls the light emitter 5 targeted for light emission such that light emitting spot 9 moves along the direction corresponding to the movement direction of the approaching bicycle. At this point, the control device 2 controls the light emitter 5 such that the light emitting spot 9 emits light in the emission color set at the step S115 and moves backward from the front side at the movement speed set at the step S115. Moreover, the control device 2 controls the motors 14 (the right front motor 14a and the right rear motor 14b or the left front motor 14c and the left rear motor 14d) targeted for driving such that the seat cushion S1 vibrates along the direction corresponding to the movement direction of the approaching object. At this point, the control device 2 controls the motors 14 such that the vibration spot vibrates in the vibration form set at the step S117 and moves backward from the front side.

Thereafter, as long as the approaching bicycle is continuously detected, the control device 2 repeats the steps S113 to S118 as described above (S119). Once the approaching bicycle is no longer detected, the control device 2 turns off the light emitter 5, and stops the motors 14 (S120). A series of steps S111 to S120 described above is repeated as needed while the vehicle V is traveling in the urban area, and the alerting control flow ends once the vehicle V leaves the urban area.

As described above, in the alerting control flow according to the second variation, the light emitter 5 positioned on the same side as the approaching bicycle emits light such that the light emitting spot 9 moves backward from the front side. At the same time, the motors 14 positioned on the same side as the approaching bicycle vibrate such that the vibration spot moves backward from the front side. Accordingly, the driver of the vehicle V visually recognizes movement (the flow) of the light emitting spot 9 or senses movement of the vibration spot, thereby intuitively grasping the presence of the approaching bicycle.

(3) Third Variation

According to a vehicle notification device according to the third variation, while the vehicle V is traveling in a predetermined area (e.g., the periphery of an intersection with poor visibility), when, e.g., a person or a bicycle (hereinafter referred to as a "laterally-approaching object") is laterally approaching the vehicle V, the laterally-approaching object is detected by the sensor, and the presence of the approaching bicycle can be notified by light emission from the light emitter 5 and vibration of the motors 14.

A configuration of the vehicle notification device according to the third variation will be described. In the third variation, a third light emitter 5C is further provided in addition to the pair of right and left light emitters 5. As in the third variation of the first embodiment, the third light emitter 5C is attached to a steering wheel W, for example (see FIG. 10). Note that a configuration of the third light emitter 5C is similar to that used in the third variation of the first embodiment, and the third light emitter 5C includes multiple light sources (lights) arranged in line along the right-to-left direction.

When the control device 2 controls the third light emitter 5C to emit light, if it is controlled such that the light to be turned on among the lights forming the third light emitter 5C is sequentially switched in the right-to-left direction, the light emitting spot 9 of the third light emitter 5C moves along the right-to-left direction as in the light emitting form in the third variation of the first embodiment illustrated in FIG. 11. Note that in the third variation of the third embodiment, the control device 2 can control the third light emitter 5C such that the light emitting spot 9 moves from the left side to the right side, and can control the third light emitter 5C such that the light emitting spot 9 moves from the right side to the left side.

Figure 22:
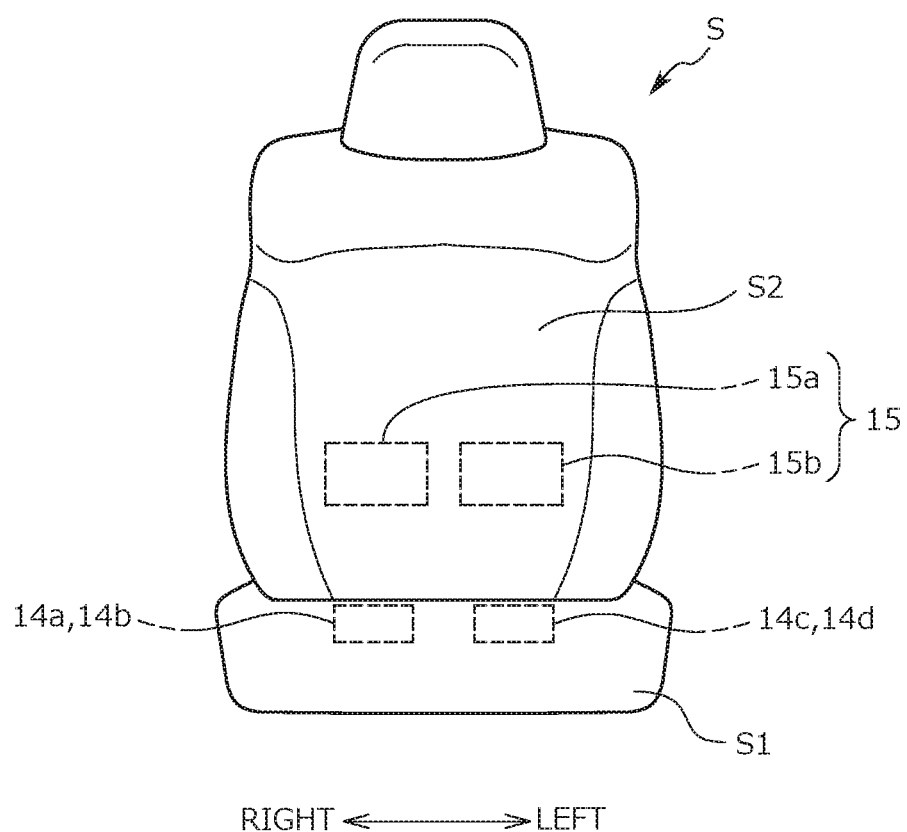
FIG. 22 is a view of a variation of arrangement of motors in a conveyance notification unit.

As in other variations, the motors 14 according to the third variation include the right front motor 14a, the right rear motor 14b, the left front motor 14c, and the left rear motor 14d arranged on the front, rear, right, and left sides at the seat cushion S1 of the seat S as illustrated in FIG. 17. Note that the present invention is not limited to above. Motors 15 including a right motor 15a and a left motor 15b may be arranged on the right and left sides of a seatback S2 as illustrated in FIG. 22, and a vibration spot may be moved in the right-to-left direction by the motors 15. FIG. 22 is a view of a variation of arrangement of the motors 15 in the vehicle notification device.

In the vehicle notification device of the third variation configured as described above, when the sensor detects the laterally-approaching object, the control device 2 identifies the position and approaching direction of the laterally-approaching object. Thereafter, the control device 2 controls the third light emitter 5C such that the light emitting spot 9 of the third light emitter 5C moves in a direction corresponding to the approaching direction of the laterally-approaching object. At the same time, the control device 2 controls the motors 14 such that the vibration spot of the motor 14 moves in the direction corresponding to the approaching direction of the laterally-approaching object.

Specifically, in a case where the laterally-approaching object is approaching the vehicle V from the left side, the control device 2 controls the third light emitter 5C such that the light emitting spot 9 moves from the left side to the right side. At the same time, the control device 2 vibrates, after the left motor 14 (specifically, the left front motor 14c or the left rear motor 14d) has vibrated, the right motor 14 (specifically, the right front motor 14a or the right rear motor 14b) such that the vibration spot moves from the left side to the right side.

Conversely, in a case where the laterally-approaching object is approaching the vehicle V from the right side, the control device 2 controls the third light emitter 5C such that the light emitting spot 9 moves from the right side to the left side. At the same time, the control device 2 vibrates, after the right motor 14 has vibrated, the left motor 14 such that the vibration spot moves from the right side to the left side.

As described above, according to the alerting control flow according to the third variation, the driver of the vehicle V visually recognizes movement (the flow) of the light emitting spot 9 at the third light emitter 5C or senses movement of the vibration spot at the motor 14, thereby intuitively grasping the presence and approaching direction of the laterally-approaching object.

Note that the alerting control flow according to the third variation is performed by steps according to the alerting control flow illustrated in FIG. 21.

(4) Fourth Variation

A vehicle notification device (hereinafter referred to as a "vehicle notification device 1N") according to the fourth variation is, as in the second embodiment above, configured to notify the driver of the traveling direction of the vehicle V via light emission from the light emitter 5 and vibration of the motors 14 when the vehicle V is reversing (traveling backward) for parking. Moreover, in a case where the approaching object is rapidly approaching the vehicle V upon reversing of the vehicle V, the vehicle notification device 1N is configured to notify the driver of the presence of the approaching object via light emission from the light emitter 5 and vibration of the motors 14.

Figure 23:
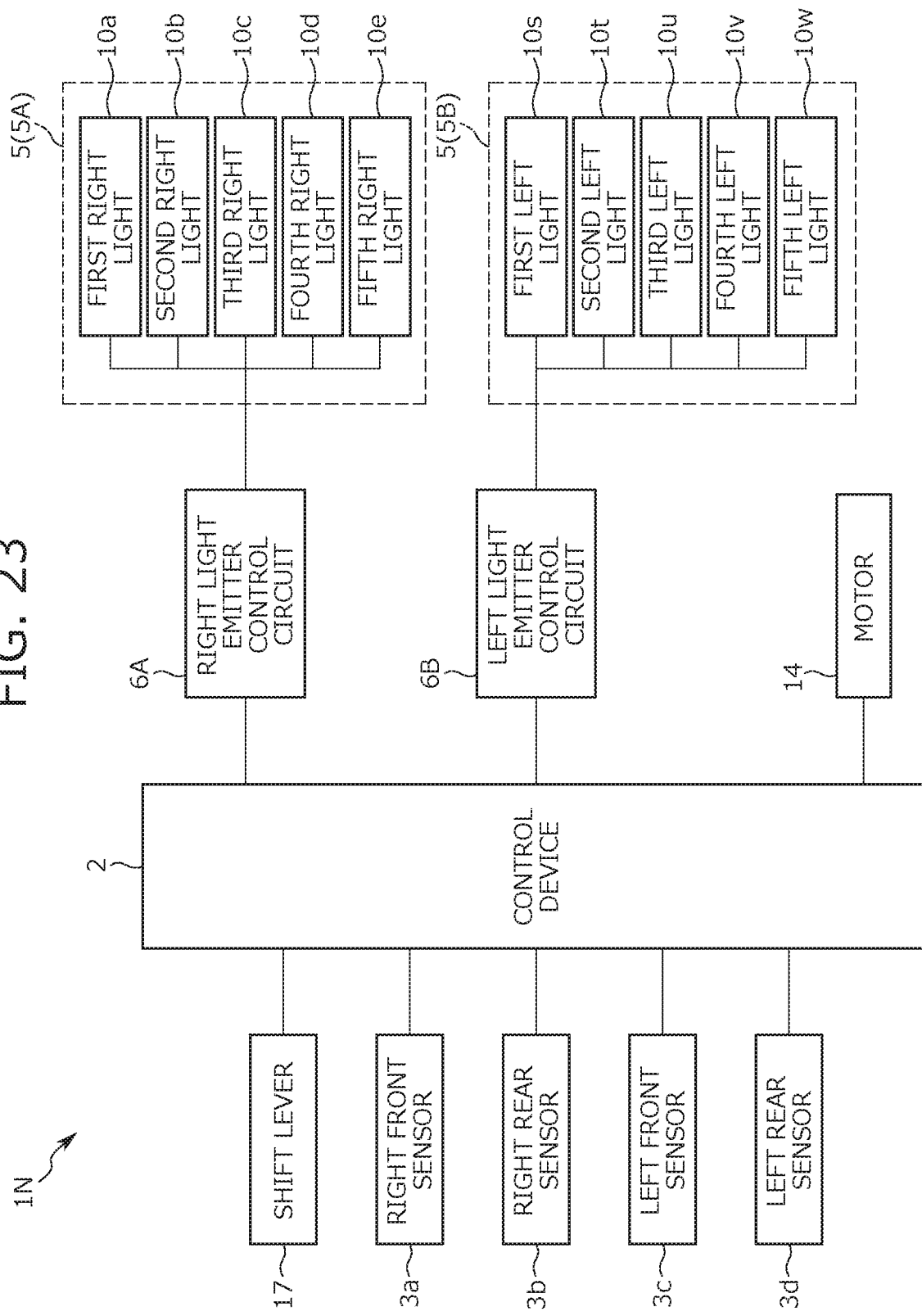
FIG. 23 is a block diagram of a configuration of a conveyance notification unit according to a fourth variation of the third embodiment.

An equipment configuration of the vehicle notification device 1N will be described with reference to FIG. 23. Such a configuration is common to the configuration of the vehicle notification device 1L illustrated in FIG. 16, except that a shift lever 17 is provided instead of the turn signal lever 7. The shift lever 17 is similar to that provided at the vehicle lighting device 1y according to the second embodiment, and is configured to output a signal indicating a lever position (hereinafter also referred to as a "shift position") after operation to the control device 2. Note that FIG. 23 is a block diagram of the equipment configuration of the vehicle notification device 1N according to the fourth variation of the third embodiment.

In the fourth variation, the control device 2 can control each light emitter 5 such that all of the lights forming the light emitter 5 are simultaneously turned on or off. By such control, the light emitting spot of the light emitter 5 blinks. Moreover, when receiving (detecting) the output signal from the shift lever 17, the control device 2 identifies the traveling direction of the vehicle V based on the signal.

In the fourth variation, the light emitting pattern of the light emitter 5 includes the pattern in the case of notifying the traveling direction of the vehicle V, and the pattern in a case where the approaching object is rapidly approaching the vehicle V. Specifically, when the vehicle V is moving (traveling) backward, the control device 2 controls the light emitter 5 to emit light in the light emitting pattern (i.e., the first light emitting pattern in the second embodiment) illustrated in FIG. 13. That is, for notifying the traveling direction of the vehicle V, the control device 2 controls the light emitter 5 such that the light emitting spot 9 of the light emitter 5 moves along a direction corresponding to the traveling direction of the vehicle V.

Note that when the right light emitter 5A emits light in the first light emitting pattern, the control device 2 controls the light emitter 5A such that the emission color of the light emitting spot 9 is the first emission color (e.g., the color of blue). In the present embodiment, an example where the right light emitter 5A emits light will be described. However, the left light emitter 5B may emit light as described later, or both of the light emitters 5A, 5B may emit light.

When the approaching object is approaching the vehicle V, the control device 2 identifies the distance between the vehicle V and the approaching object and the approaching speed of the approaching object. Thereafter, the control device 2 determines whether or not each of the identified distance and the identified approaching speed exceeds the threshold. In a case where the control device 2 determines that at least one of the identified distance and the identified approaching speed exceeds the threshold, the control device 2 controls the light emitter 5 to emit light in the pattern (i.e., the second light emitting pattern in the second embodiment) illustrated in FIG. 14. At this point, the control device 2 causes only one, which corresponds to the position of the approaching object, of the pair of right and left light emitters 5 to emit light.

As described above, for notifying that the approaching object is approaching the vehicle V, the control device 2 controls the light emitter 5 such that all of the lights forming the light emitter 5 corresponding to the position of the approaching object are simultaneously turned on or off. Accordingly, the entire area of the light emitter 5 corresponding to the position of the approaching object serves as the light emitting spot 9, and the light emitting spot 9 blinks.

Note that when the light emitter 5 corresponding to the position of the approaching object emits light in the second light emitting pattern, the control device 2 controls the light emitter 5 such that the emission color of the light emitting spot 9 is the second emission color (e.g., the color of red). Moreover, the blinking speed upon blinking of the light emitting spot 9 may be a constant speed, or may be changed according to the degree of approaching of the approaching object. For example, the blinking speed may increase as the approaching object approaches.

Next, vibration of the motor 14 according to the fourth variation will be described. In the present variation, the motors 14 vibrate to notify, as in the light emitter 5, the occupant of the traveling direction of the vehicle V in addition to the presence of the approaching object. Examples of the vibration form of the motor 14 include the form in which relatively-weak vibration (hereinafter referred to as "first vibration) is provided at the relatively-long vibration interval as illustrated in FIG. 18A, and the form in which relatively-strong vibration (hereinafter referred to as "second vibration") is provided at the relatively-short vibration interval as illustrated in FIG. 18B. The vibration form for providing the first vibration and the vibration form for providing the second vibration are mere examples, and for example, a vibration form in which vibration is continuously provided may be included.

The first vibration is vibration that the control device 2 causes the motor 14 to generate for notifying the traveling direction of the vehicle V. The second vibration is vibration generated by the motor 14 for notifying that the approaching object is rapidly approaching the vehicle V. In the case of notifying that the approaching object is rapidly approaching the vehicle V, an immediate response is necessary as compared to the case of notifying the traveling direction of the vehicle V. For this reason, the second vibration whose vibration interval is shorter than that of the first vibration and whose intensity is higher than that of the first vibration is used, and as a result, vibration with a higher notification effect is provided.

When the vehicle V is traveling backward, the control device 2 controls, for notifying the traveling direction of the vehicle V, the motors 14 such that a vibration spot at which the first vibration is generated moves backward from the front side. Specifically, the control device 2 vibrates the right rear motor 14b on the rear side after the right front motor 14a on the front side has vibrated.

Note that in the present variation, the case where the right front motor 14a and the right rear motor 14b on the right side vibrate has been described by way of example. However, the left front motor 14c and the left rear motor 14d on the left side may vibrate, or all of the right front motor 14a, the right rear motor 14b, the left front motor 14c, and the left rear motor 14d may vibrate. Note that the motor 14 to be vibrated may be set as necessary according to the location of the occupant (specifically, the location of a driver seat).

In the case of notifying that the approaching object is approaching the vehicle V, when at least one of the identified distance and the identified approaching speed exceeds the threshold, the control device 2 controls the motors 14 such that vibration (i.e., the second vibration) is provided in the form illustrated in FIG. 18B. At this point, the control device 2 vibrates only ones, which correspond to the position of the approaching object, of the motors 14 on the right and left sides, thereby generating the second vibration. That is, in a case where the approaching object is positioned on the right side of the vehicle V, the control device 2 vibrates only the right front motor 14a and the right rear motor 14b on the right side. Conversely, in a case where the approaching object is positioned on the left side of the vehicle V, the control device 2 vibrates only the left front motor 14c and the left rear motor 14d on the left side.

Figure 24:
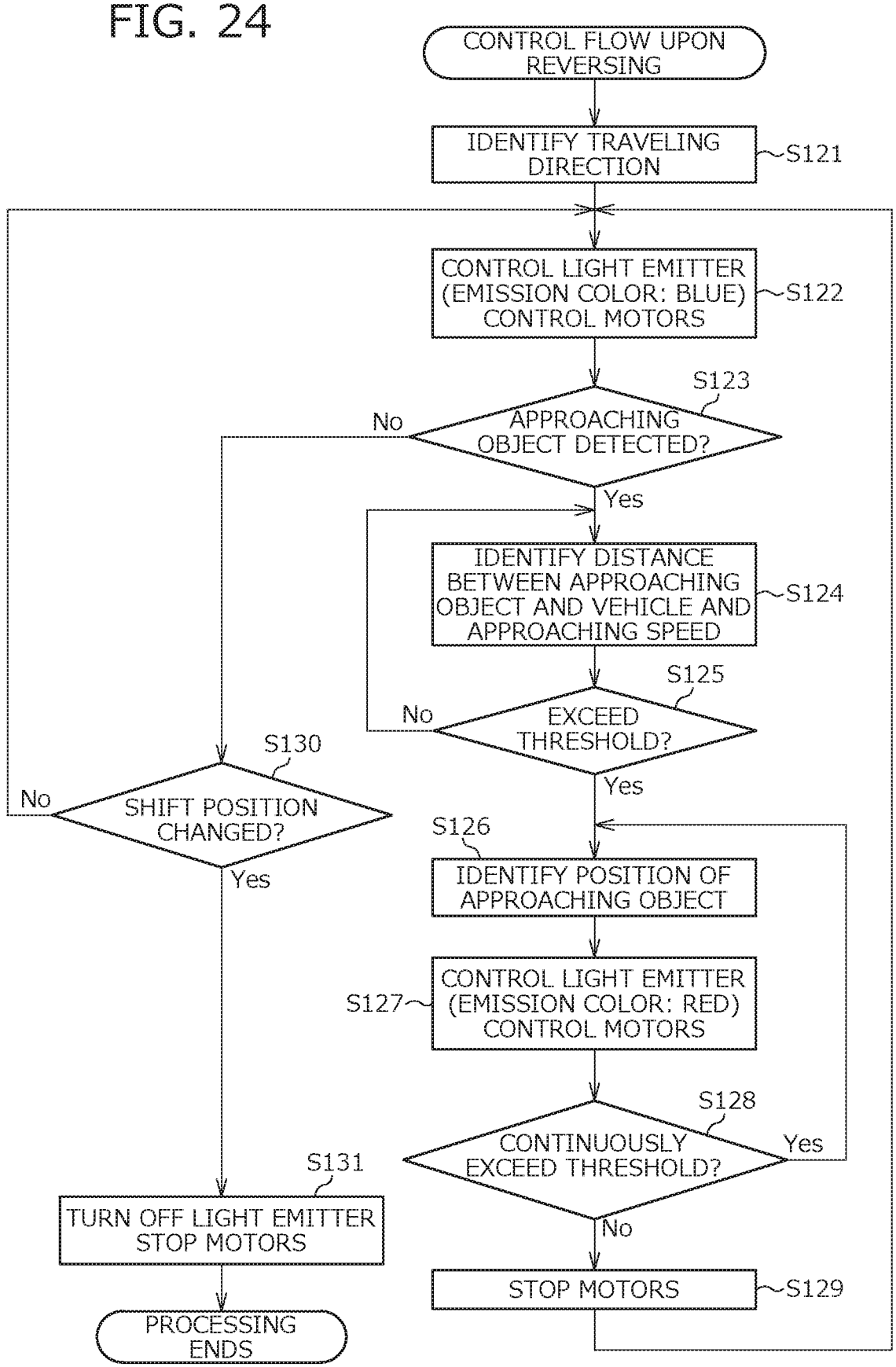
FIG. 24 is a flowchart of a control flow upon reversing according to the fourth variation of the third embodiment.

Next, a control flow when the vehicle V is reversing (upon reversing) in the fourth variation will be described with reference to FIG. 24. FIG. 24 is a flowchart of the control flow upon reversing.

The control flow upon reversing according to the fourth variation is substantially common to the control flow upon reversing according to the second embodiment as seen from FIGS. 15 and 24. Specifically, when a shift lever 17 is operated such that the shift position is brought into "R" and the control device 2 identifies that the shift position is "R," such operation and identification are taken as a trigger to start the control flow upon reversing. When the control flow upon reversing begins, the control device 2 identifies the traveling direction of the vehicle V based on a current shift position (S121). At this point, since the shift position is set to "R," the control device 2 identifies, at the step S121, the traveling direction of the vehicle V traveling backward.

Thereafter, for notifying the driver of the identified traveling direction of the vehicle V, the control device 2 controls the right light emitter 5A such that the light emitting spot 9 of the right light emitter 5A moves backward from the front side (S122). At this point, the control device 2 controls the right light emitter 5A such that the emission color of the light emitting spot 9 is the color of blue. Moreover, the control device 2 causes the right light emitter 5A to emit light as described above while controlling the motors 14 such that the vibration spot moves backward from the front side (S122). At this point, the control device 2 controls the motors 14 such that vibration to be generated is the first vibration.

Based on the presence or absence of the output signal received from each sensor, the control device 2 determines whether or not each sensor has detected the approaching object (S123). When it is determined that there is a detected approaching object, the control device 2 identifies, based on information indicated by the signal received from the sensor, the distance between the vehicle V and the approaching object and the approaching speed of the approaching object (S124). Thereafter, the control device 2 determines whether or not each of the identified distance and the identified approaching speed exceeds the threshold (S125). Then, when it is determined that each of the distance and the approaching speed does not exceed the threshold, the control device 2 controls the right light emitter 5A to continuously emit light in the above-described pattern (i.e., the first light emitting pattern), and controls the motors 14 such that the vibration spot at which the first vibration is generated moves backward from the front side.

On the other hand, when it is determined that at least one of the distance and the approaching speed identified at the step S124 exceeds the threshold, the control device 2 identifies the position of the approaching object (S126). In addition, the control device 2 controls the light emitter 5 such that the entire area of one, which corresponds to the position of the approaching object, of the pair of right and left light emitters 5 blinks (i.e., emits light in the second light emitting pattern) (S127). At this point, the control device 2 controls the light emitter 5 corresponding to the position of the approaching object such that the emission color of the light emitting spot 9 is the color of red. Moreover, the control device 2 causes the light emitter 5 corresponding to the position of the approaching object to emit light in the second light emitting pattern while controlling only ones, which correspond to the position of the approaching object, of the motors 14 provided on the right and left sides (S127). At this point, the control device 2 controls the motors 14 corresponding to the position of the approaching object such that vibration to be generated is the second vibration.

Thereafter, as long as a state in which at least one of the distance between the vehicle V and the approaching object and the approaching speed of the approaching object exceeds the threshold is continued (Yes at S128), the control device 2 continuously causes the light emitter 5 corresponding to the position of the approaching object to emit light in the second light emitting pattern, and continuously drives the motors 14 such that the seat S continuously generates the second vibration. On the other hand, in a case where any of the distance and the approaching speed falls below the threshold (No at S128), the control device 2 stops the operation of driving the motors 14 in the form for providing the second vibration (S129), and stops the operation of light emission performed so far in the second light emitting pattern. Thereafter, the control device 2 controls the right light emitter 5A to emit light in the first light emitting pattern, and controls the motors 14 such that the vibration spot at which the first vibration is generated moves backward from the front side.

Of a series of steps described above, the steps S124 to S129 are repeatedly performed as long as it is, at the step S123, determined that there is a detected approaching object. On the other hand, when it is, at the step S123, determined that there is no detected approaching object, the control device 2 determines whether or not the shift position has been changed (clearly, whether or not the shift position has been changed to other positions than "R") (S130). In a case where it is determined that the shift position has been changed to other positions than "R," the control device 2 turns off the light emitter 5, and stops the motors 14 (S131). When the step S131 ends, the control flow upon reversing ends at this point.

As described above, according to the control flow upon reversing according to the fourth variation, while the vehicle V is reversing, the light emitter 5A and the motors 14 on the right side are controlled such that the light emitting spot 9 and the vibration spot move backward from the front side. Accordingly, the driver of the vehicle V visually recognizes movement (the flow) of the light emitting spot 9 or senses movement of the vibration spot, thereby recognizing the traveling direction of the vehicle V (i.e., recognizing that the vehicle V is reversing).

Moreover, in the control flow upon reversing according to the fourth variation, the light emitting pattern (specifically, the range, motion, and emission color of the light emitting spot 9) of the light emitter 5 and the vibration form (specifically, the vibration spot, the vibration intensity, and the vibration interval) of the motor 14 are changed according to the identified result of at least one of the distance between the vehicle V and the approaching object and the approaching speed of the approaching object. Accordingly, the driver grasps the degree of approaching of the approaching object based on a change in the light emitting pattern and the vibration form.

Note that in the above-described case, for notifying the traveling direction of the vehicle V while the vehicle V is reversing, the light emitter 5 and the motors 14 are controlled such that the light emitting spot 9 and the vibration spot move backward from the front side. Note that the present invention is not limited to above, and the light emitter 5 and the motors 14 may be, for notifying the traveling direction of the vehicle V while the vehicle V is traveling forward, such that the light emitting spot 9 and the vibration spot move forward from the rear side.

Moreover, in the above-described case, for the purpose of notifying the traveling direction of the vehicle, the light emitter 5 emits light, and the motors 14 vibrate. However, use of the vehicle notification device according to the fourth variation is not limited to the above-described purpose. For example, the vehicle notification device may be utilized for the purpose of guiding, via light emission from the light emitter 5 and vibration of the motors 14, a path and a traveling direction to a destination set on the car navigation system.

Fourth Embodiment

According to the fourth embodiment, a vehicle interior part 100 configured such that a light emitting state of a lighting device is easily visually recognized even in the case of strong external light such as daytime is implemented. The vehicle interior part 100 according to the present embodiment is mounted inside a vehicle V such as an automobile. The vehicle interior part 100 includes a lighting device 110 attached to a door trim 105 of the vehicle V, and a light shield 105a provided as part of the door trim 105 and configured to shield light into the lighting device 110 from the outside of the vehicle V. Hereinafter, a configuration of the vehicle interior part 100 according to the present embodiment will be described with reference to FIGS. 24 to 27.

Figure 25:
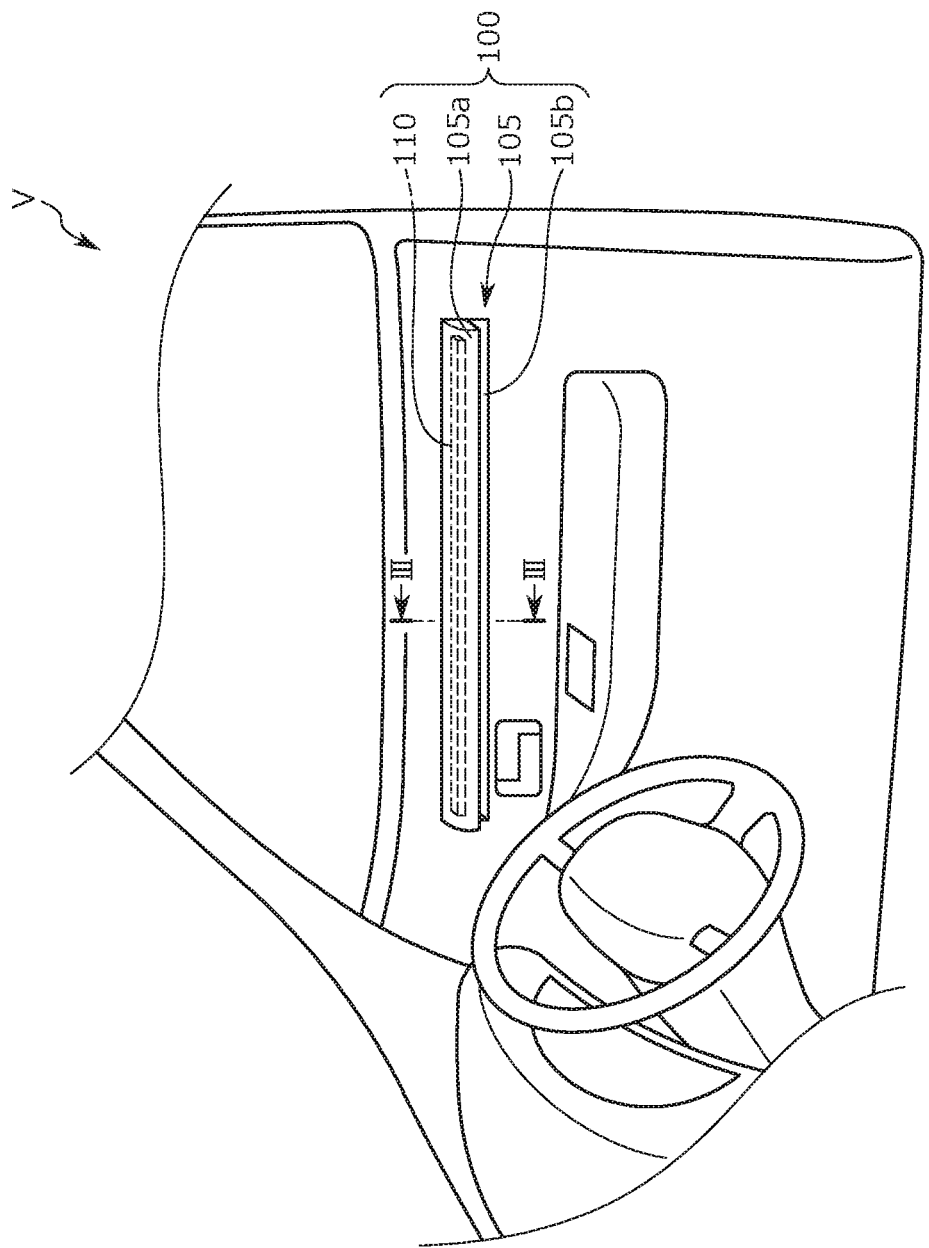
FIG. 25 is a schematic view of the interior of a vehicle on which a vehicle interior part according to a fourth embodiment is mounted.

FIG. 25 is a schematic view of the interior of the vehicle V on which the vehicle interior part 100 is mounted. Specifically, FIG. 25 illustrates a door portion contacting a driver seat of the vehicle V. As illustrated in FIG. 25, the vehicle interior part 100 is an in-car lighting device including the light shield 105a and a reflector 105b configured as part of the door trim 105 and the lighting device 110 at least partially covered with the light shield 105a.

Figure 26:
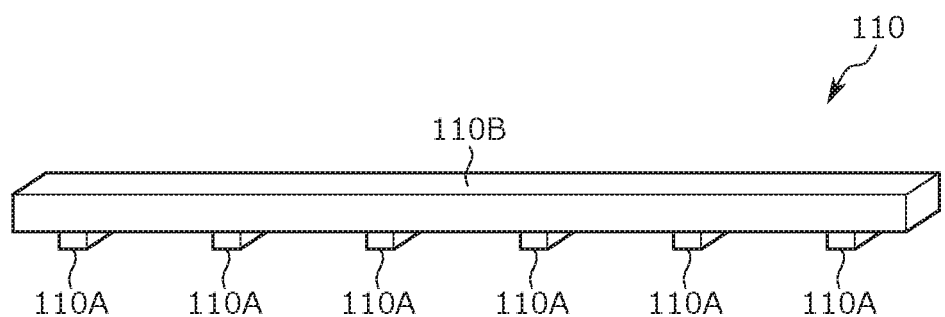
FIG. 26 is a view of a configuration example of a lighting device according to the fourth embodiment.

FIG. 26 is a view of a configuration example of the lighting device 110. As illustrated in FIG. 26, the lighting device 110 is configured such that multiple light emitting elements 110A are attached to a lower surface of a substrate 110B at predetermined intervals. For example, each light emitting element 110A is connected to a not-shown control circuit, and is controlled between a light emitting state and a non-light emitting state according to a control signal from the control circuit. Specifically, each light emitting element 110A is controlled such that the light emitting elements 110A sequentially emit light one by one, starting from the light emitting element 110A positioned at an end. In this manner, a scene can be provided as if light flows in a predetermined direction. In some cases, such a scene is for notifying a driver of approaching of the other vehicles in a case where it is detected that the other vehicles are approaching the vehicle V from the rear side, for example.

For example, when the lighting device 110 is attached to the door trim 105 as it is, the light emitting elements 110A of the lighting device 110 are irradiated with external light such as sunlight during daytime, and for this reason, a light emitting state of the lighting device 110 is difficult to be checked. Thus, as illustrated in FIG. 27, in the vehicle interior part 100 according to the present embodiment, the light shield 105a projecting inward of the vehicle is provided at the door trim 105, and the lighting device 110 is provided inside (i.e., a portion surrounded by the door trim 105 and the light shield 105a) the light shield 105a.

Figure 27:
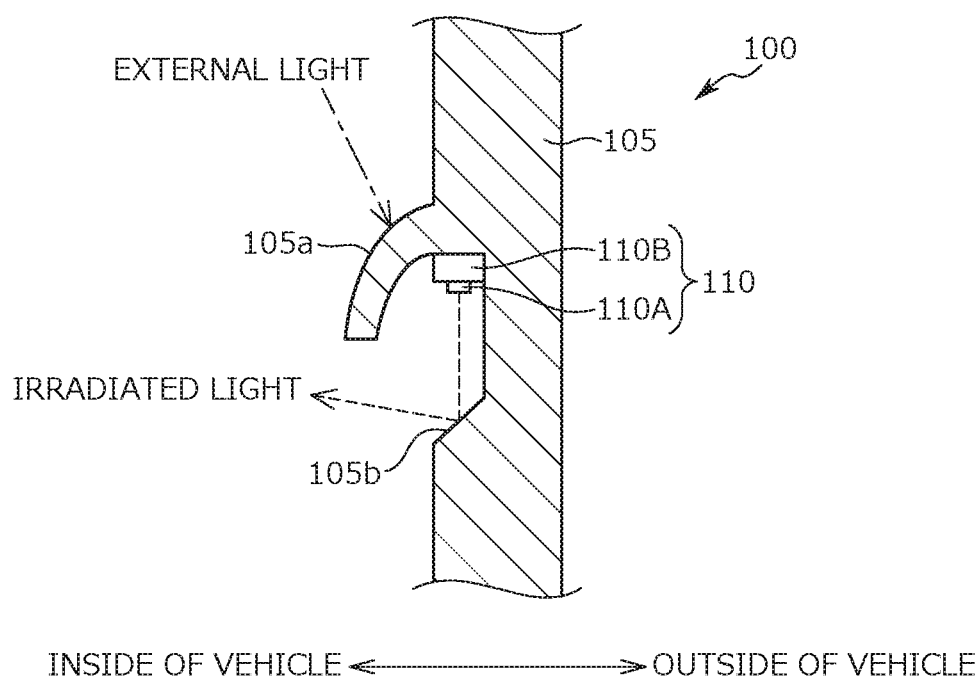
FIG. 27 is an sectional view of FIG. 25.

Note that in an example illustrated in FIG. 27, the light shield 105a is in such a shape that the light shield 105a projects inward of the vehicle and a tip end of the light shield 105a extends downward.

The lighting device 110 described herein is attached to the inside of the light shield 105a of the door trim 105 such that light emitting surfaces of the light emitting elements 110A face downward. The lighting device 110 is arranged as described above, and therefore, upper portions of the light emitting elements 110A of the lighting device 110 on the inside of the vehicle are covered with the light shield 105a. Thus, external light is shielded by the light shield 105a, and therefore, the light emitting elements 110A are not directly irradiated with the external light.

On the other hand, the reflector 105b configured to reflect light emitted from the light emitting elements 110A toward the inside of the vehicle is formed below the light emitting elements 110A. The reflector 105b is properly angled so that light emitted from the light emitting elements 110A can be visually recognized by the driver.

Note that the reflector 105b may be made of resin, metal, etc., and is not specifically limited as long as the reflector 105b is made of a material reflecting light.

Figure 28:
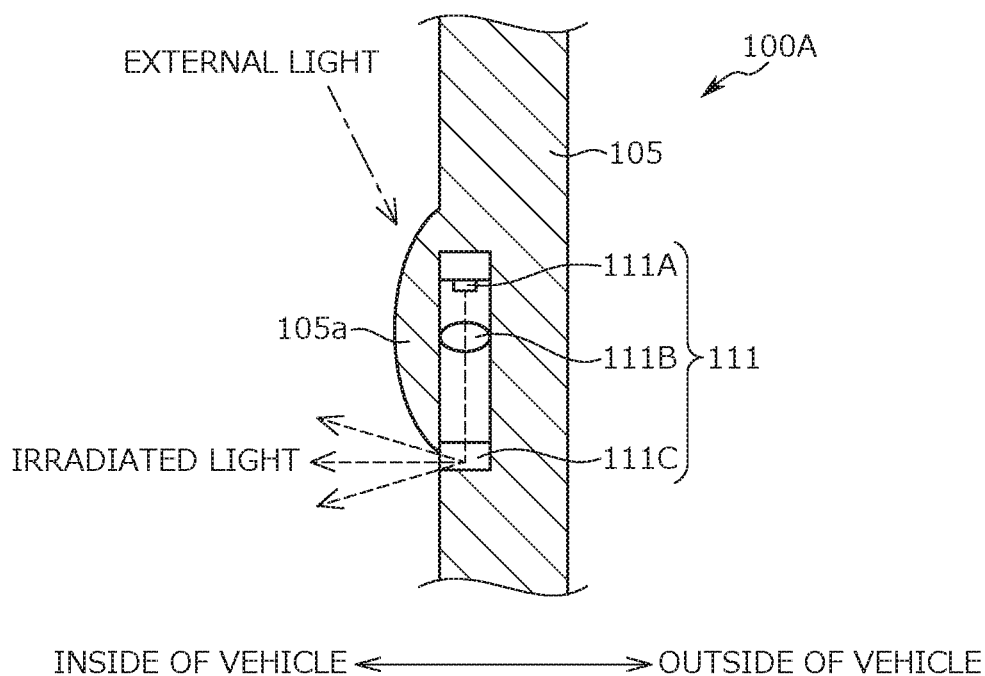
FIG. 28 is a sectional view for describing a configuration of a vehicle interior part according to a variation of the fourth embodiment.

FIG. 28 is a view of a configuration of a vehicle interior part 100A according to a variation of the fourth embodiment, and schematically illustrates a sectional view at a position similar to that of FIG. 27. As illustrated in FIG. 28, a lighting device 111 mounted on the vehicle interior part 100A includes light emitting elements 111A, a lens 111B, and a light diffusion element 111C.

The lighting device 111 described herein is housed in a space surrounded by the light shield 105a of the door trim 105 and the door trim 105, and only the light diffusion element 111C of the lighting device 111 is not covered with the light shield 105a. That is, it is configured such that at least part of the light diffusion element 111C is exposed to the inside of the vehicle.

Light emitted from the light emitting elements 111A of the lighting device 111 is condensed to the light diffusion element 111C by the lens 111B, and illuminates the vehicle inner side with the light being diffused by the light diffusion element 111C. At this point, light (external light) from the outside of the vehicle V is shielded by the light shield 105a, and therefore, the driver can easily visually recognize light from the light diffusion element 111C.

According to the vehicle interior part 100, 100A described above, the light emitting state of the lighting device 100, 111 is easily visually recognized even in the case of strong external light such as daytime. Moreover, part of the door trim 105 serves as the light shield 105a, and therefore, the light shield 105a is, as a design, assimilated into other portions of the door trim 105 than the light shield 105a. Thus, designability can be improved as compared to the case of forming the light shield 105a as a separate component. Further, part of the door trim 105 serves as the light shield 105a, and therefore, the number of components can be reduced as compared to the case of forming the light shield 105a and the door trim 105 as separate bodies.

In the vehicle interior part 100, 100A, the light shield 105a is provided above the lighting device 110, 111 so that direct contact of light entering from above the lighting device 110, 111 with the lighting device 110, 111 can be prevented. Thus, the light emitting state of the lighting device 110, 111 is easily visually recognized.

Moreover, in the vehicle interior part 100, 100A, it is configured such that the light shield 105a projects inward of the vehicle from above the lighting device 110, 111, and therefore, an area light-shieldable by the light shield 105a can be large.

Further, in the vehicle interior part 100, 100A, the light shield 105a covers at least part of the lighting device 110, 111, and therefore, external light can be shielded even when the incident angle of the external light has changed. Thus, a light shielding effect can be enhanced. Moreover, the light shielding effect does not depend on a season or a period of time.

In addition, in the vehicle interior part 100, the reflector 105b configured to reflect light irradiated from the lighting device 110 is provided below the light shield 105a, and therefore, light from the lighting device 110 can be easily visually recognized in a state in which influence of light from the outside of the vehicle is eliminated.

Note that the number of light emitting elements 110A of the lighting device 110 may be one.

REFERENCE SIGNS LIST 1, 1x, 1y: vehicle lighting device (conveyance light emitting unit)
1L, 1M, 1N: vehicle notification device (conveyance notification unit)
2: control device (controller)
3a: right front sensor (detector)
3b: right rear sensor (detector)
3c: left front sensor (detector)
3d: left rear sensor (detector)
4: buzzer
5, 5A, 5B, 5C: light emitter
6A: right light emitter control circuit
6B: left light emitter control circuit
7: turn signal lever
8: touch switch
9: light emitting spot
10a, 10b, 10c, 10d, 10e: right light
10s, 10t, 10u, 10v, 10w: left light
14, 15: motor
   14a: right front motor
   14b: right rear motor
   14c: left front motor
   14d: left rear motor
   15a: right motor
   15b: left motor
17: shift lever
100, 100A: vehicle interior part
105: door trim
   105a: light shield
   105b: reflector
110, 111: lighting device
   110A: light emitting element
   110B: substrate
   111A: light emitting element
   111B: lens
   111C: light diffusion element D: door
V: vehicle (conveyance)
R: door lining
W: steering wheel

The invention claimed is:

1. A conveyance light emitting unit comprising:
a detector configured to detect an object approaching a conveyance, wherein the detector comprising at least one sensor;
light emitters attached to an interior surface of the conveyance; and
a controller configured to control the light emitters when the detector has detected the object, wherein
the controller is in communication with the detector and the light emitters,
each of the light emitters comprises at least one light,
two of the light emitters are arranged separately from each other in a width direction of the conveyance,
the controller is configured to identify a current position of the conveyance and determine whether or not the conveyance is traveling in an urban area, and
when the controller has determined that the conveyance is traveling in the urban area and when the detector has detected the object, the controller identifies a position of the object relative to the conveyance and causes a light of only one of the two light emitters to emit light, the one of the two light emitters corresponding to the identified position of the object.

2. The conveyance light emitting unit according to claim 1, wherein
at least one of the light emitters is arranged at a front portion of a member facing an inside of a room of the conveyance among members forming a door provided at the conveyance.

3. The conveyance light emitting unit according to claim 1, wherein each of the light emitters comprises:
a plurality of lights adjacently arranged; and
a light emitting spot on the each of the light emitters, wherein the light emitting spot is defined by a single activation of a light among the plurality of lights such that a change in the single activation of the light among the plurality of lights changes the position of the spot on the light emitter, and
the controller controls the plurality of lights of each of the light emitters such that the light emitting spot of the light emitter moves along a direction and/or at a rate corresponding to a velocity of the object detected by the detector.

4. The conveyance light emitting unit according to claim 3, wherein
when the detector has detected the object approaching the conveyance from a rear side of the conveyance in a forward traveling state or a stop state, the controller controls the light emitters such that the light emitting spot moves forward from the rear side in a front-to-rear direction of the conveyance.

5. The conveyance light emitting unit according to claim 3, wherein
when the detector has detected the object approaching the conveyance from a front side of the conveyance in a forward traveling state, the controller controls the light emitters such that the light emitting spot moves backward from the front side in a front-to-rear direction of the conveyance.

6. The conveyance light emitting unit according to claim 3, wherein
when the detector has detected the object, the controller identifies at least one item of a distance between the conveyance and the object and an approaching speed when the object is approaching the conveyance, and controls the light emitters such that the light emitting spot moves at a movement speed corresponding to an identified result of the item.

7. The conveyance light emitting unit according to claim 6, wherein
when identifying the distance, the controller controls the light emitters such that the light emitting spot moves faster as the distance decreases and moves slower as the distance increases, and
when identifying the approaching speed, the controller controls the light emitters such that the light emitting spot moves faster as the approaching speed increases and moves slower as the approaching speed decreases.

8. The conveyance light emitting unit according to claim 3, wherein
each of the light emitters emits light such that the light emitting spot moves while blinking, and
when the detector has detected the object, the controller identifies at least one item of a distance between the conveyance and the object and an approaching speed when the object is approaching the conveyance, and controls the light emitters such that the light emitting spot moves while blinking at a blinking speed corresponding to an identified result of the item.

9. The conveyance light emitting unit according to claim 3, wherein
an emission color of the light emitting spot is variable, and
when the detector has detected the object, the controller identifies at least one item of a distance between the conveyance and the object and an approaching speed when the object is approaching the conveyance, and controls the light emitters such that the emission color of the light emitting spot changes to a color corresponding to an identified result of the item.

* * * * *